US011378002B1

(12) United States Patent
Leone et al.

(10) Patent No.: US 11,378,002 B1
(45) Date of Patent: Jul. 5, 2022

(54) SYSTEMS AND METHODS FOR ADJUSTABLE PRE-CHAMBER

(71) Applicant: Ford Global Technologies, LLC, Dearborn, MI (US)

(72) Inventors: Thomas Leone, Ypsilanti, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/233,136

(22) Filed: Apr. 16, 2021

(51) Int. Cl.
*F02B 19/10* (2006.01)
*F02B 19/12* (2006.01)

(52) U.S. Cl.
CPC ...... *F02B 19/1047* (2013.01); *F02B 19/1033* (2013.01); *F02B 19/1052* (2013.01); *F02B 19/12* (2013.01)

(58) Field of Classification Search
CPC ............. F02B 19/1047; F02B 19/1033; F02B 19/1052; F02B 19/12
See application file for complete search history.

(56) References Cited

U.S. PATENT DOCUMENTS

| | | | |
|---|---|---|---|
| 4,424,780 A * | 1/1984 | Trucco | F02B 19/02 123/255 |
| 5,189,333 A | 2/1993 | Kagawa et al. | |
| 5,463,267 A | 10/1995 | Conway | |
| 5,826,558 A * | 10/1998 | Kawamura | F02B 19/02 123/292 |
| 6,848,413 B1 * | 2/2005 | Suder | F02B 19/00 123/286 |
| 7,513,234 B1 | 4/2009 | Baldwin et al. | |
| 9,447,744 B2 | 9/2016 | Jammoussi et al. | |
| 9,890,690 B2 | 2/2018 | Chiera et al. | |
| 10,550,757 B2 | 2/2020 | Rabhi | |
| 11,085,402 B1 * | 8/2021 | Vroman | F02M 23/04 |
| 11,156,149 B1 * | 10/2021 | Leone | F02B 19/16 |
| 2006/0219210 A1 | 10/2006 | Bailey et al. | |
| 2018/0294624 A1 | 10/2018 | Niessner et al. | |
| 2019/0353088 A1 | 11/2019 | Ketterer | |

FOREIGN PATENT DOCUMENTS

| | | |
|---|---|---|
| DE | 102006037412 A1 | 2/2008 |
| DE | 102017222814 A1 | 6/2019 |
| DE | 102018220171 A1 | 5/2020 |
| JP | 2020505542 A | 2/2020 |
| KR | 20030000002 A | 1/2003 |

OTHER PUBLICATIONS

Leon, T. et al., "Methods and Systems for a Series Gap Igniter With a Passive Pre-Chamber," U.S. Appl. No. 16/796,160, filed Feb. 20, 2020, 68 pages.

(Continued)

*Primary Examiner* — Xiao En Mo
(74) *Attorney, Agent, or Firm* — Vincent Mastrogiacomo; McCoy Russell LLP

(57) ABSTRACT

Methods and systems are provided for a pre-chamber. In one example, the pre-chamber includes a moveable element configured to adjust an orifice opening area of the pre-chamber in response to conditions.

18 Claims, 15 Drawing Sheets

(56) References Cited

OTHER PUBLICATIONS

Leon, T. et al., "Methods and Systems for a Series Gap Igniter With a Passive Pre-Chamber," U.S. Appl. No. 16/920,861, filed Jul. 6, 2020, 66 pages.
Leon, T. et al., "Systems and Methods for a Variable Volume Pre-Chamber Igniter," U.S. Appl. No. 17/018,481, filed Sep. 11, 2020, 54 pages.
Leon, T. et al., "Methods and Systems for a Variable Volume Pre-Chamber Igniter," U.S. Appl. No. 17/018,558, filed Sep. 11, 2020, 59 pages.

* cited by examiner

SYSTEMS AND METHODS FOR ADJUSTABLE PRE-CHAMBER

FIELD

The present description relates generally to methods and systems for adjusting an orifice opening size of a pre-chamber in response to conditions.

BACKGROUND/SUMMARY

An internal combustion engine may combust an air-fuel mixture within cylinders to produce torque, which may be used to propel a vehicle. In some such engines, an ignition source may be used to ignite the air-fuel mixture within each cylinder during a compression stroke. For example, in spark-ignition engines, each cylinder may include a spark plug for directly igniting the air-fuel mixture within the cylinder. In other examples, the air-fuel mixture within the cylinder may be ignited by jets of hot gas and flame from a pre-combustion chamber, referred to herein as a pre-chamber.

A passive pre-chamber may be a walled chamber located in the clearance volume of the cylinder and may include a spark plug. During engine operation, an air-fuel mixture is introduced into the cylinder, and a fraction of the air-fuel mixture is inducted into the passive pre-chamber via a pressure differential between the passive pre-chamber and the cylinder during a compression stroke of the cylinder. When ignition is requested, the spark plug in the pre-chamber is actuated, igniting the fraction of the air-fuel mixture in the pre-chamber. After the fraction of the air-fuel mixture is ignited in the pre-chamber, jets of flame and hot gas may exit the pre-chamber and enter the cylinder via one or more holes in the pre-chamber walls. These jets ignite the air-fuel mixture in the cylinder to produce torque.

Pre-chamber ignition may offer performance and efficiency benefits over a traditional spark-ignition engine during some engine operating conditions. For example, a cylinder with pre-chamber ignition may operate with more dilution (e.g., more exhaust gas recirculation or a leaner air-fuel ratio) than a similar cylinder of a traditional spark-ignition engine, which may lead to lower fuel consumption and emissions. In other examples, a cylinder with pre-chamber ignition may produce more power than a cylinder ignited by a spark plug due to an increased burn rate in the cylinder, which may reduce an amount of time for knocking combustion to occur and thereby allow ignition timing to be advanced further toward maximum brake torque (MBT).

In some examples of pre-chambers, a series gap igniter may be arranged therein. The series gap igniter may include a first spark gap in a first volume and a second spark gap in a second volume. The second spark gap outside the pre-chamber may provide ignition at a wide range of conditions.

However, the inventors herein have recognized potential issues with such systems. As one example, a passive pre-chamber without a series gap igniter may not provide reliable ignition over the full range of engine operating conditions. Thus an engine with a passive pre-chamber may demand a second spark plug, which increases cost and decreases the space available for valves, fuel injectors, cooling passages, etc. As another example, the electrodes of the series gap igniter may heat up during some engine conditions. The electrode of the previous example may be unable to sufficiently dissipate this heat during higher power engine conditions, leading to hot spots. The hot spots may cause undesired pre-ignition, which may decrease engine power output and combustion stability. Repeated occurrence of the hot spots may reduce a remaining useful life of the spark plug. Furthermore, a packaging size of the series gap igniter in a pre-chamber may be greater than pre-chambers with an ignition device including only a single spark gap.

In one example, the issues described above may be addressed by a system including a pre-chamber arranged in a cylinder, wherein the pre-chamber includes a moveable element configured to adjust an orifice opening area of the pre-chamber. In this way, combustion conditions may be enhanced at a plurality of engine conditions.

As one example, the moveable element is adjusted in response to an engine load. The moveable element may be adjusted to a second position to increase the orifice opening area of the pre-chamber in response to a low engine load and to a first position to decrease the orifice opening area in response to a high engine load. The moveable element may be further configured to actuate to positions between the first and second positions to further provide greater control of combustion conditions. By doing this, fuel economy may increase and a longevity of an ignition device of the pre-chamber may also increase.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
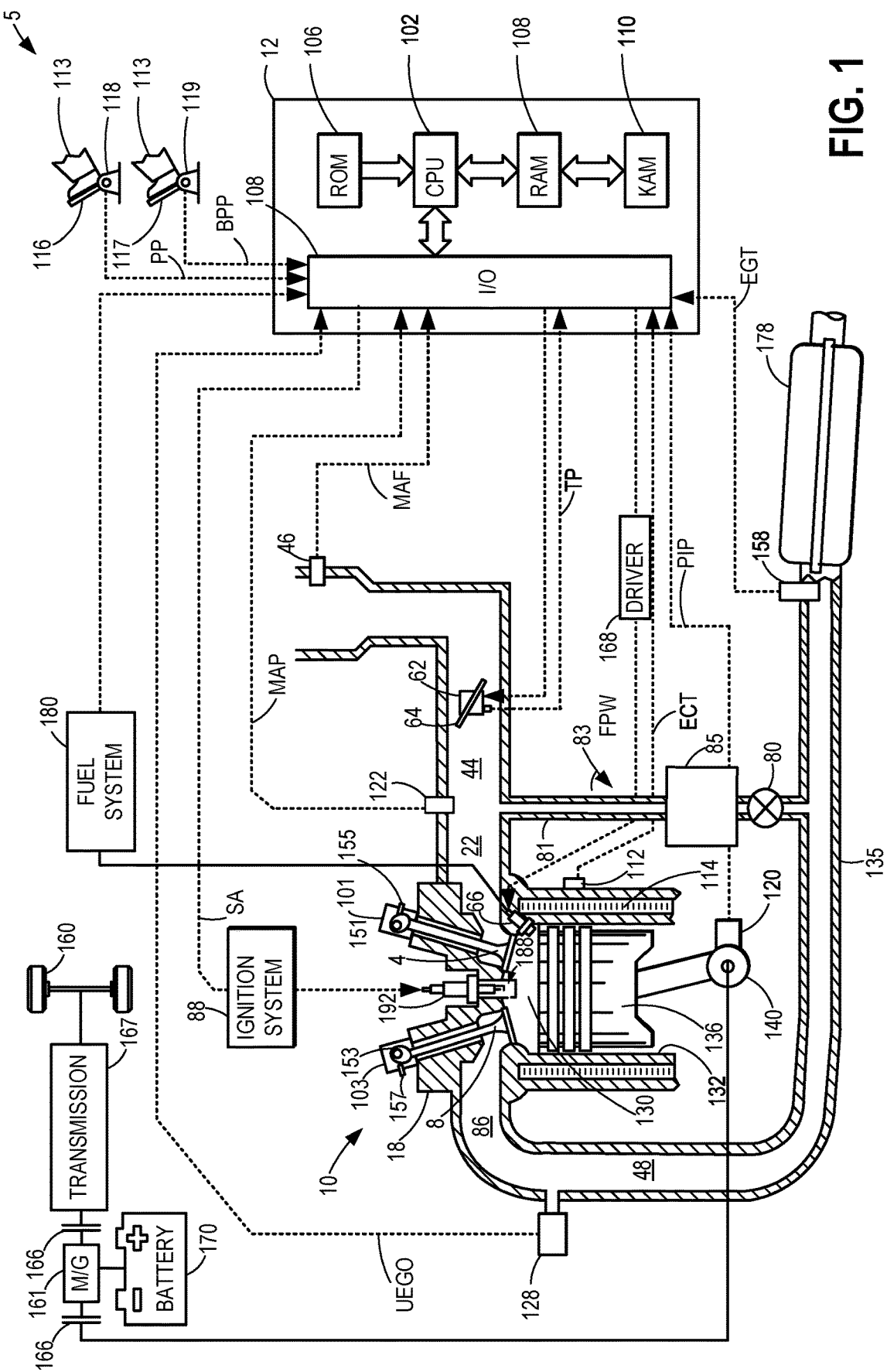
FIG. 1 shows a schematic depiction of a cylinder configuration in an engine system of a vehicle.
Figure 8:
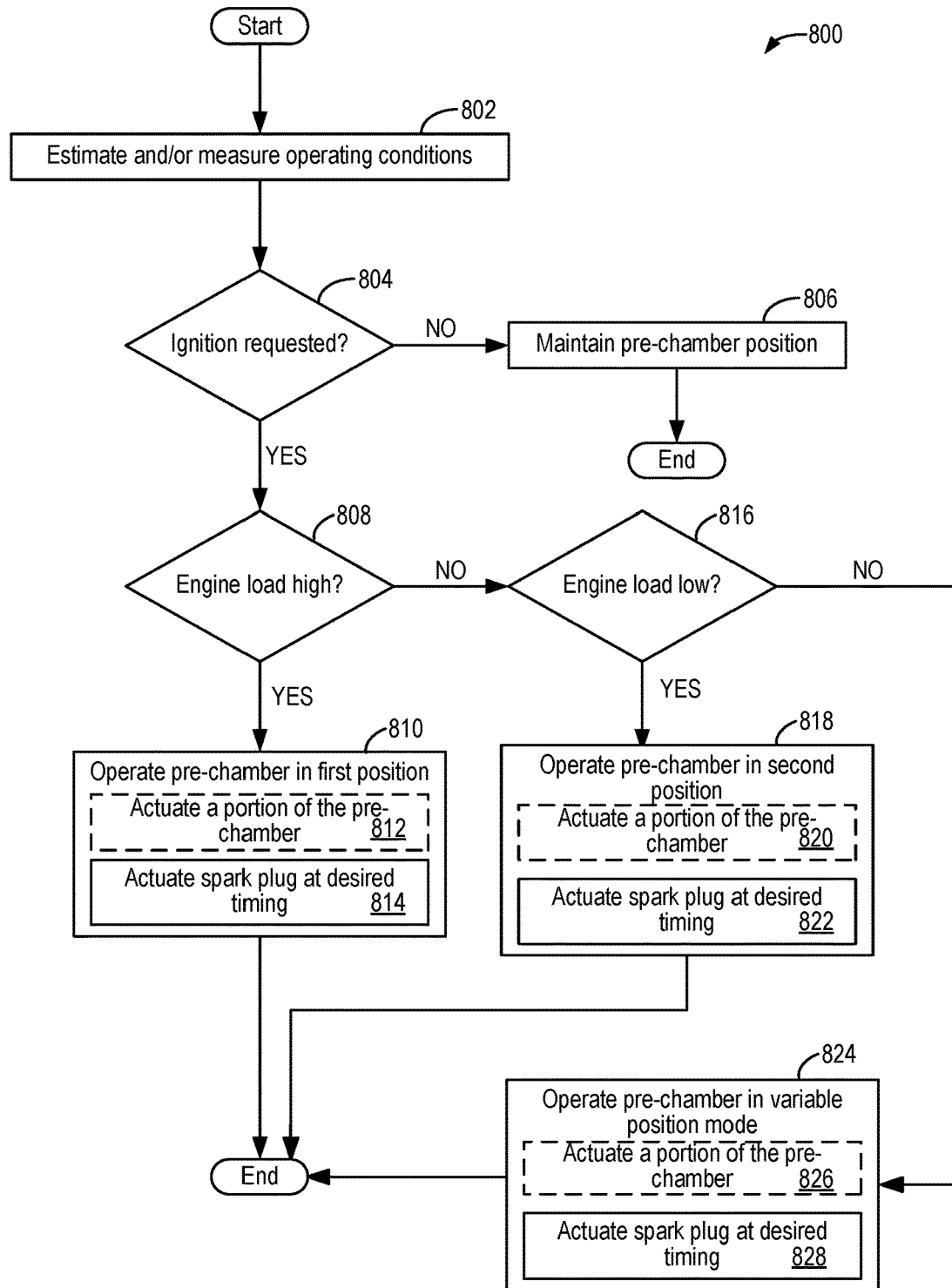
FIG. 8 shows a method for operating an adjustable pre-chamber.
Figure 9:
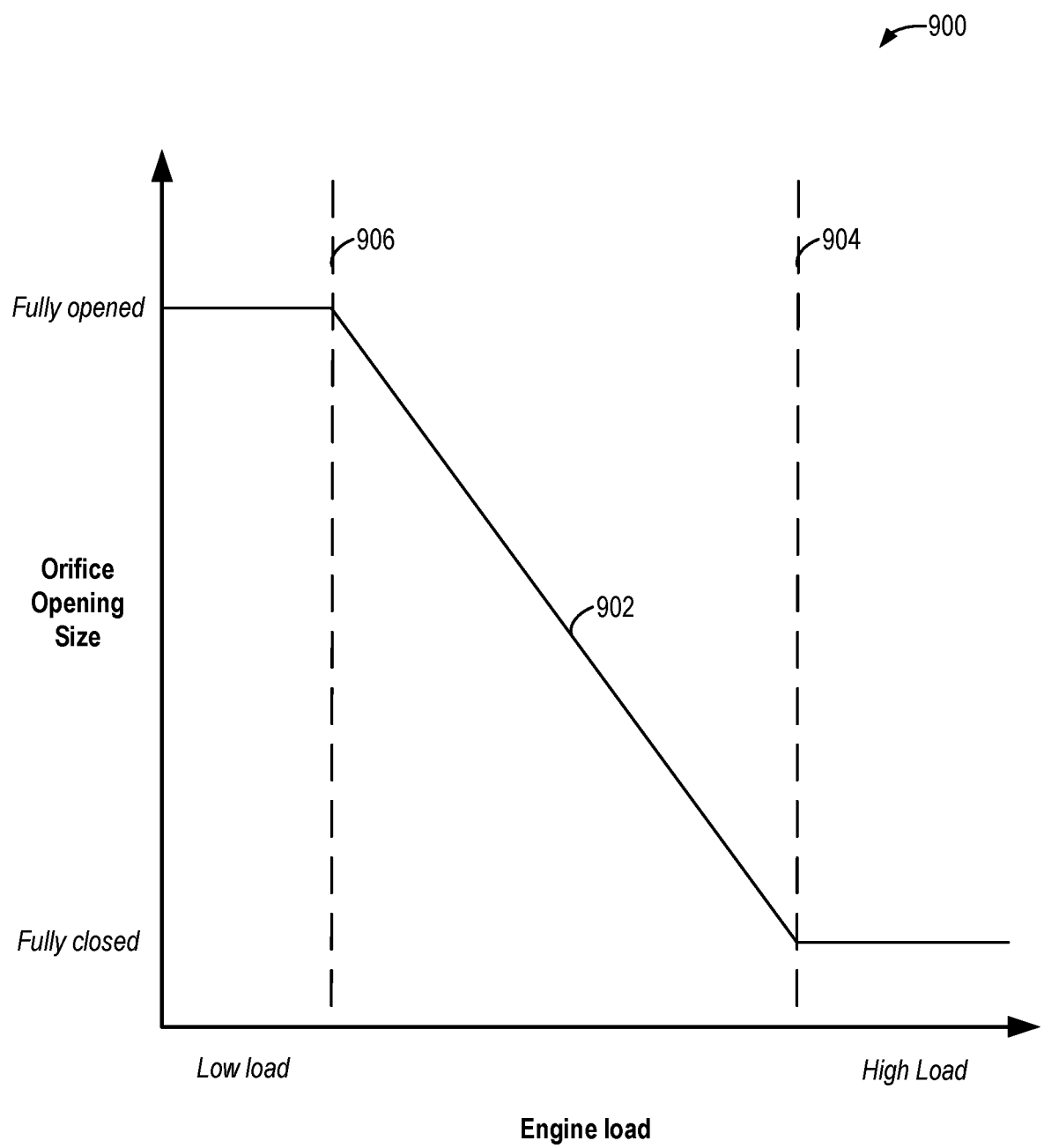
FIG. 9 shows a graph showing adjustable parts of the pre-chamber being adjusted based on engine load.

The following description relates to systems and methods for a pre-chamber. In one example, the pre-chamber is positioned in a main combustion chamber of an engine of a hybrid vehicle, as illustrated in FIG. 1. The pre-chamber may be an adjustable pre-chamber, wherein one or more portions of the pre-chamber may be actuated to adjust an orifice size of openings thereof. By doing this, reliable ignition of the main combustion chamber may be maintained over a wider range of engine operating conditions, without a second spark plug and without the risk of hot spots from a series gap igniter. Various embodiments of the pre-chamber are illustrated in FIGS. 2A-7F. A method for adjusting the orifice size of the pre-chamber in response to an engine load is illustrated in FIG. 8. A graphical illustration of an orifice size in relation to engine load is illustrated in FIG. 9.

Turning now to the figures, FIG. 1 shows a partial view of a single cylinder 130 of an internal combustion engine 10 that may be included in a vehicle 5. Internal combustion engine 10 may be a multi-cylinder engine. Cylinder (e.g., combustion chamber) 130 includes a coolant sleeve 114 and cylinder walls 132, with a piston 136 positioned therein and connected to a crankshaft 140. Cylinder 130 is shown communicating with an intake manifold 44 via an intake valve 4 and an intake port 22 and with an exhaust manifold 48 via an exhaust valve 8 and an exhaust port 86. A throttle 62 including a throttle plate 64 may be provided in an intake passage upstream of intake manifold 44 for varying a flow rate and/or pressure of intake air provided to the engine cylinders.

In the depicted view, intake valve 4 and exhaust valve 8 are located at an upper region of cylinder 130, and may be coupled to a cylinder head 18. Intake valve 4 and exhaust valve 8 may be controlled by a controller 12 using respective cam actuation systems including one or more cams. The cam actuation systems may utilize one or more of variable displacement engine (VDE), cam profile switching (CPS), variable cam timing (VCT), variable valve timing (VVT), and/or variable valve lift (VVL) systems to vary valve operation. In the depicted example, intake valve 4 is controlled by an intake cam 151, and exhaust valve 8 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valve and exhaust valve may be deactivated via the intake valve timing actuator 101 and exhaust valve timing actuator 103, respectively. The position of intake cam 151 and exhaust cam 153 may be determined by camshaft position sensors 155 and 157, respectively.

In some examples, the intake and/or exhaust valve may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system. The various valve control systems may be used to vary a timing, open duration, and lift of intake valve 4 and exhaust valve 8.

An exhaust passage 135 can receive exhaust gases from other cylinders of engine 10 in addition to cylinder 130. An exhaust gas sensor 128 is shown coupled to exhaust passage 135 upstream of an emission control device 178. Exhaust gas sensor 128 may be selected from among various suitable sensors for providing an indication of an exhaust gas air-fuel ratio (AFR), such as a linear oxygen sensor or UEGO (universal or wide-range exhaust gas oxygen), a two-state oxygen sensor or EGO, a HEGO (heated EGO), a NOx sensor, a HC sensor, or a CO sensor, for example. Emission control device 178 may be a three-way catalyst, a NOx trap, various other emission control devices, or combinations thereof.

External exhaust gas recirculation (EGR) may be provided to the engine via a high pressure EGR system 83, delivering exhaust gas from a zone of higher pressure in exhaust passage 135 to a zone of lower pressure in intake manifold 44, downstream of throttle 62, via an EGR passage 81. An amount of EGR provided to intake manifold 44 may be varied by controller 12 via an EGR valve 80. For example, controller 12 may be configured to actuate and adjust a position of EGR valve 80 to adjust the amount of exhaust gas flowing through EGR passage 81. EGR valve 80 may be adjusted between a fully closed position, in which exhaust gas flow through EGR passage 81 is blocked, and a fully open position, in which exhaust gas flow through the EGR passage is enabled. As an example, EGR valve 80 may be continuously variable between the fully closed position and the fully open position. As such, the controller may increase a degree of opening of EGR valve 80 to increase an amount of EGR provided to intake manifold 44 and decrease the degree of opening of EGR valve 80 to decrease the amount of EGR provided to intake manifold 44. As an example, EGR valve 80 may be an electronically actuated solenoid valve. In other examples, EGR valve 80 may be positioned by an incorporated stepper motor, which may be actuated by controller 12 to adjust the position of EGR valve 80 through a range of discreet steps (e.g., 52 steps), or EGR valve 80 may be another type of flow control valve. Further, EGR may be cooled via passing through an EGR cooler 85 within EGR passage 81. EGR cooler 85 may reject heat from the EGR gases to engine coolant, for example.

Under some conditions, the EGR system may be used to regulate a temperature of the air and fuel mixture within the combustion chamber. Further, EGR may be desired to attain a desired engine dilution, thereby increasing fuel efficiency and emissions quality, such as emissions of nitrogen oxides. As an example, EGR may be requested at low-to-mid engine loads. Thus, it may be desirable to measure or estimate the EGR mass flow. EGR sensors may be arranged within EGR passage 81 and may provide an indication of one or more of mass flow, pressure, and temperature of the exhaust gas, for example. Additionally, EGR may be desired after emission control device 178 has attained its light-off temperature. An amount of EGR requested may be based on engine operating conditions, including engine load, engine speed, engine temperature, etc. For example, controller 12 may refer to a look-up table having the engine speed and load as the input and output a desired amount of EGR corresponding to the input engine speed-load. In another example, controller 12 may determine the desired amount of EGR (e.g., desired EGR flow rate) through logic rules that directly take into account parameters such as engine load, engine speed, engine temperature, etc. In still other examples, controller 12 may rely on a model that correlates a change in engine load with a change in a dilution requirement, and further correlates the change in the dilution requirement with a change in the amount of EGR requested. For example, as the engine load increases from a low load to a mid-load, the amount of EGR requested may increase, and then as the engine load increases from a mid-load to a high load, the amount of EGR requested may decrease. Controller 12 may further determine the amount of EGR requested by taking into account a best fuel economy mapping for a desired dilution rate. After determining the amount of EGR requested, controller 12 may refer to a look-up table having the requested amount of EGR as the input and a signal corresponding to a degree of opening to apply to the EGR valve (e.g., as sent to the stepper motor or other valve actuation device) as the output.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. The compression ratio may also be increased if pre-chamber ignition increases knock resistance due to faster combustion.

As a non-limiting example, cylinder 130 is shown including a fuel injector 66. Fuel injector 66 is shown coupled directly to cylinder 130 for injecting fuel directly therein in proportion to a pulse-width of a signal FPW received from controller 12 via an electronic driver 168. In this manner, fuel injector 66 provides what is known as direct injection (hereafter also referred to as "DI") of fuel into cylinder 130. In another example, fuel injector 66 may be a port injector providing fuel into the intake port upstream of cylinder 130. Further, while FIG. 1 shows fuel injected to the cylinder via a single injector, the engine may alternatively be operated by injecting fuel via multiple injectors, such as one direct injector and one port injector. For example, both port and direct injectors may be included in a configuration that is known as port fuel and direct injection (PFDI). In such a configuration, controller 12 may vary a relative amount of injection from each injector.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In this way, air and fuel are delivered to cylinder 130, which may produce a combustible air-fuel mixture.

Fuel may be delivered by fuel injector 66 to cylinder 130 during a single cycle of the cylinder. Further, the distribution and/or relative amount of fuel delivered from fuel injector 66 may vary with operating conditions. Furthermore, for a single combustion event, multiple injections of the delivered fuel may be performed per cycle. The multiple injections may be performed during a compression stroke, intake stroke, or any appropriate combination thereof.

In the example shown in FIG. 1, cylinder 130 includes a pre-chamber igniter 192 coupled to cylinder head 18 for initiating combustion. In some examples, the pre-chamber ignited 192 may be coupled to a mounting surface different than the cylinder head 18, such as a cylinder block or other portion of the cylinder. Pre-chamber igniter 192 includes a spark plug having a spark gap and further may include an adjustable pre-chamber cap and an internal cavity, referred to herein as a pre-chamber 188. Pre-chamber 188 may be configured in a plurality of embodiments, as illustrated in FIGS. 2A-7F. Further, the walls of pre-chamber 188, which enclose the pre-chamber igniter 192, may include a plurality of openings. In one example, the pre-chamber igniter 192 is the only ignition device of the cylinder 130. As such, there are no other ignition devices in the engine 10 other than the pre-chamber igniter 192.

Each opening may provide a fluid coupling between pre-chamber 188 and cylinder 130, fluidically coupling an interior of pre-chamber 188 to an interior of cylinder 130. In one example, the pre-chamber 188 may include an actuator configured to adjust an opening size of the plurality of openings based on conditions of the engine 10. Thus, during some conditions, gases may flow between pre-chamber 188 and the interior of cylinder 130. For example, gases (e.g., air, fuel, and/or residual combustion gases) may flow through each opening with a directionality and rate based on a pressure difference across the opening (e.g., between pre-chamber 188 and the interior of cylinder 130). Further, each opening may expel an ignition flame (or jet) to cylinder 130, as will be elaborated with respect to FIGS. 2A-7F.

An ignition system 88 may produce an ignition spark in pre-chamber igniter 192 in response to a spark advance signal SA from controller 12 under select operating modes. A timing of signal SA may be adjusted based on engine operating conditions and a driver torque demand. For example, spark may be provided at maximum brake torque (MBT) timing to maximize engine power and efficiency. Controller 12 may input engine operating conditions, including engine speed, engine load, and exhaust gas AFR, into a look-up table, which may output the corresponding MBT timing for the input engine operating conditions. In other examples, spark may be retarded from MBT to prevent an occurrence of knock. In still other examples, spark may be retarded from MBT to reduce engine torque, such as due to a decrease in driver-demanded torque or a transmission gear shift event, or to provide a torque reserve. When pre-chamber igniter 192 sparks, the air-fuel mixture within the pre-chamber may combust, the increased pressure of combustion sending jets of flame into cylinder 130 via the plurality of orifice openings in the pre-chamber walls. The plurality of openings may be arranged such that the jets of flame are evenly distributed in cylinder 130. The jets of flame may ignite the air-fuel mixture in cylinder 130, causing combustion in cylinder 130. Additionally or alternatively, the size of the plurality of pre-chamber openings may be adjusted such that jets of flame occur reliably over a wider range of engine operating conditions. Additionally or alternatively, the size of the plurality of pre-chamber openings may be adjusted such that in some conditions, combustion inside the pre-chamber igniter 192 may propagate into the air-fuel mixture within cylinder 130 without creating jets of flame.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 1 as a microcomputer, including a microprocessor unit 102, input/output ports 104, an electronic storage medium for executable programs and calibration values shown as a read-only memory 106 in this particular example, random access memory 108, keep alive memory 110, and a data bus. Storage medium read-only memory 106 can be programmed with computer readable data representing instructions executable by microprocessor unit 102 for performing the methods and routines described herein as well as other variants that are anticipated but not specifically listed.

Controller 12 may receive various signals from sensors coupled to engine 10, in addition to those signals previously discussed, including a measurement of inducted mass air flow (MAF) from a mass air flow sensor 46, an engine coolant temperature signal (ECT) from an ECT sensor 112 coupled to coolant sleeve 114, signal UEGO from exhaust gas sensor 128, which may be used by controller 12 to determine the AFR of the exhaust gas, an exhaust gas temperature signal (EGT) from a temperature sensor 158 coupled to exhaust passage 135, a profile ignition pickup signal (PIP) from a Hall effect sensor 120 (or other type) coupled to crankshaft 140, a throttle position (TP) from a throttle position sensor coupled to throttle 62, and an manifold absolute pressure signal (MAP) from a MAP sensor 122 coupled to intake manifold 44. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, pre-chamber igniter 192, the intake/exhaust valves and cams, etc. The controller may receive input data from the various sensors, process the input data, and trigger the actuators in response to the processed input data based on instructions or code programmed therein corresponding to one or more routines, an example of which is described with respect to FIG. 8.

In some examples, vehicle 5 may be a hybrid vehicle with multiple sources of torque available to one or more vehicle wheels 160. In other examples, vehicle 5 is a conventional vehicle with only an engine. In the example shown in FIG. 1, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example, during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

As described above, FIG. 1 shows only one cylinder of a multi-cylinder engine. As such, each cylinder may similarly include its own set of intake/exhaust valves, fuel injector(s), igniter, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 130.

Figure 2A:
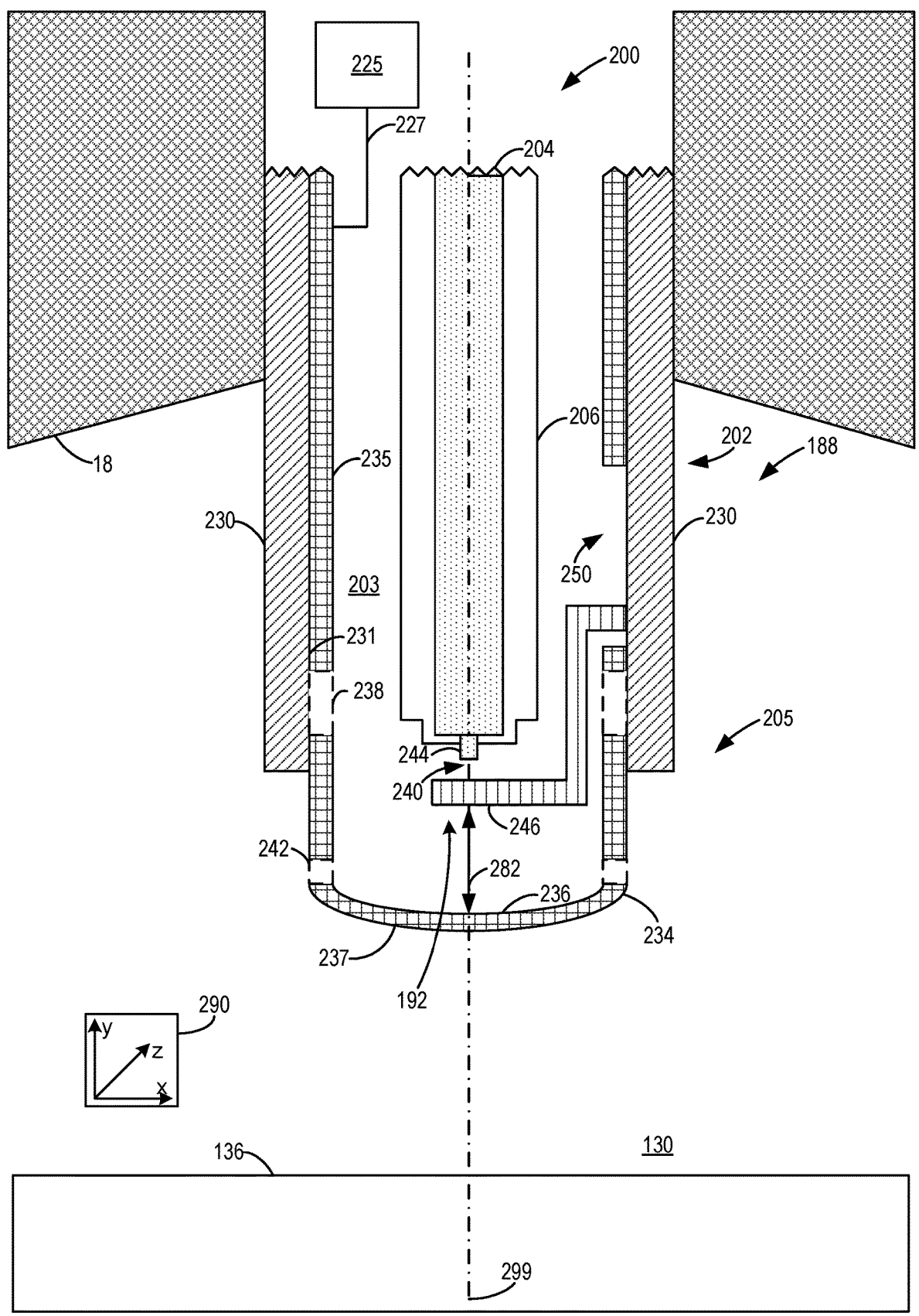
FIG. 2A schematically shows a detailed view of a first pre-chamber system with an adjustable pre-chamber cap in a first position.
Figure 2B:
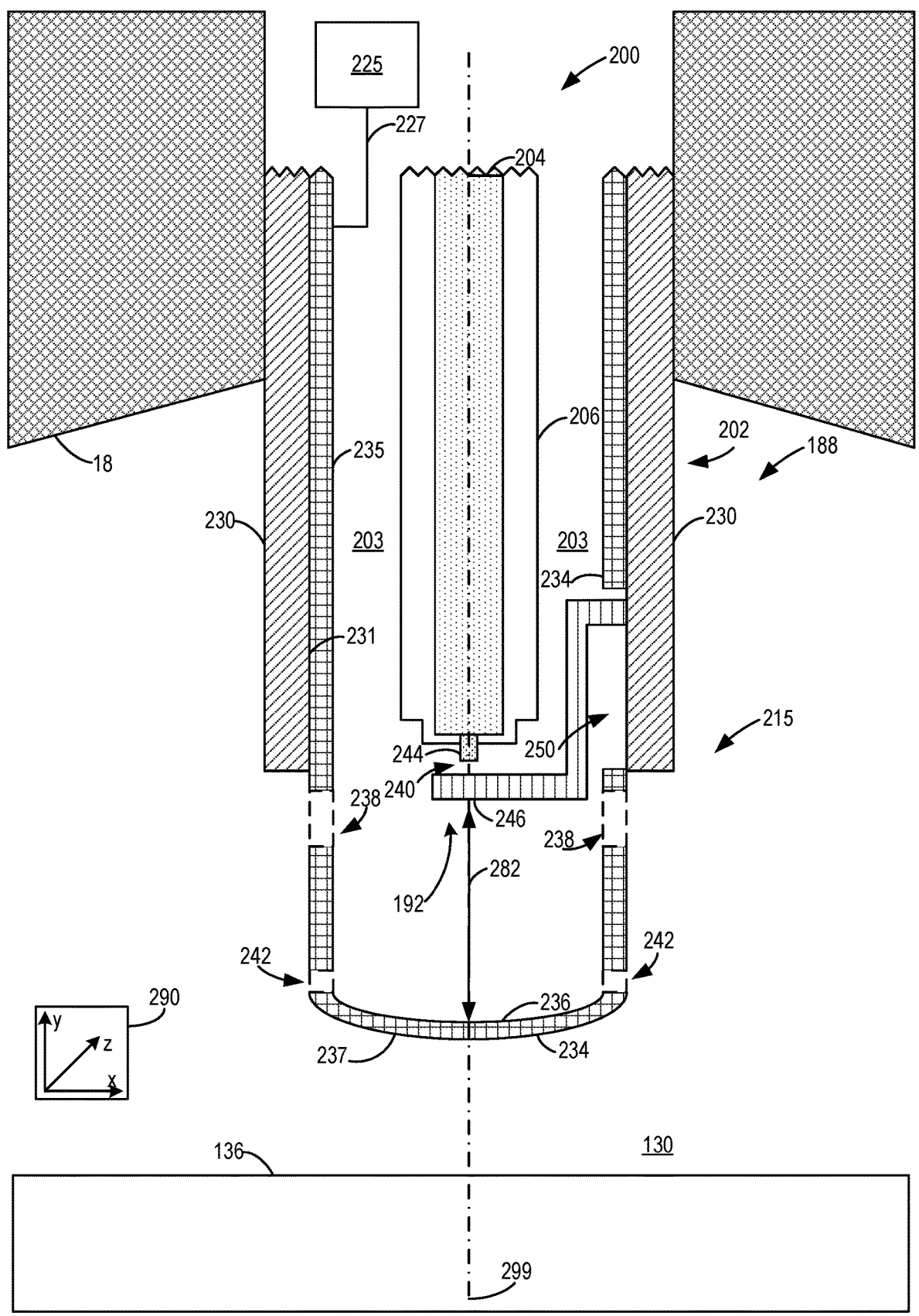
FIG. 2B schematically shows a detailed view of the first pre-chamber system with the adjustable pre-chamber cap in a second position.

Next, FIGS. 2A and 2B show symmetrical cross-sectional views of a first pre-chamber system 200, which may be one example of pre-chamber 188 introduced in FIG. 1. As such, components previously introduced in FIG. 1 are numbered identically in this figure and subsequent figures. Further, FIGS. 2A and 2B are substantially identical except for the position of a pre-chamber cap 234 and will be described collectively. In particular, FIG. 2A shows the first pre-chamber system 200 with pre-chamber cap 234 in a first position 205, where an interior volume 203 of first pre-chamber system 200 is smaller, and FIG. 2B shows the first pre-chamber system 200 with pre-chamber cap 234 in a second position 215, where the interior volume 203 of first pre-chamber system 200 is larger. FIGS. 2A and 2B are described in tandem herein.

An axis system 290 includes three-axes, namely an x-axis parallel to a horizontal direction, a y-axis parallel to a vertical direction, and a z-axis parallel to a transverse direction and normal to each of the x- and y-axes. The axis system 290 is merely illustrative and does not suggest a limiting orientation of the pre-chamber 188. In some examples, additionally or alternatively, the y-axis may be parallel to horizontal (e.g., a horizontally opposed engine) or angled to horizontal and vertical (e.g., a V-orientation engine) without departing from the scope of the present disclosure. A thickness of elements of the pre-chamber 188 may be measured along the x-axis. A width of elements of the pre-chamber 188 may be measured along the z-axis. A length of elements of the pre-chamber 188 may be measured along the y-axis.

As shown in FIGS. 2A and 2B and elaborated above with respect to FIG. 1, the cylinder 130 is defined at least partially by the cylinder head 18. Further, first pre-chamber system 200 includes a pre-chamber body 202, which may form a substantially cylindrical tube with a central axis 299. In particular, the pre-chamber body 202 may include an exterior surface 230 and an interior surface 231. Some portions of exterior surface 230 may be coupled to cylinder head 18. As one example, pre-chamber body 202 may be threaded into cylinder head 18. As such, maintenance and/or replacement of the pre-chamber 188 is simplified relative to other ways of couplings (e.g., welding, fusion, and the like). Further, a portion of the pre-chamber body 202 may extend into the cylinder 130 from the cylinder head 18. Together, the pre-chamber body 202, a pre-chamber cap 234, and a pre-chamber sleeve 235 may provide walls that divide (e.g., separate) the interior volume 203 of the pre-chamber 188 from the cylinder 130. An orifice opening size of the pre-chamber 188 may be adjusted as shown in FIGS. 2A and 2B. In the example of the first pre-chamber system 200, a volume of the interior volume 203 is adjusted as the orifice opening size of the pre-chamber 188 is adjusted, independent of the volume of the cylinder 130.

Central axis 299 may be perpendicular to a surface of piston 136 (only a portion of which is shown in FIGS. 2A and 2B) and parallel to cylinder walls 132 shown in FIG. 1, for example. In one example, the central axis 299 corresponds to an axis about which the piston 136 oscillates. The pre-chamber body 202 may be directly or indirectly coupled to an electrical ground.

In one example, the pre-chamber body 202 comprises a tubular shape. The pre-chamber body 202 may be open at extreme ends thereof with walls (e.g., exterior surface 230 and interior surface 231) extending into a cylinder head space and the cylinder 130. In alternative embodiments, the pre-chamber body 202 may not be tubular and instead may include a pyramidal, spherical, rectangular prism, or other three-dimensional shape with ends thereof being open.

The pre-chamber cap 234 may comprise a domed, disk shape protruding in a direction toward the piston 136 and away from pre-chamber igniter 192. In some examples, additionally or alternatively, the pre-chamber cap 234 may be flat or protrude toward the pre-chamber igniter 192. The pre-chamber cap 234 includes an inner surface 236 and an outer surface 237. Outer surface 237 is the closest surface of pre-chamber cap 234 to piston 136. A distance between a top surface of piston 136 and outer surface 237 may be larger when pre-chamber cap 234 is in the first (retracted) position 205 of FIG. 2A and smaller when pre-chamber cap 234 is in the second (extended) position 215 of FIG. 2B. Thus, pre-chamber cap 234 is retracted from piston 136 (and toward cylinder head 18) in first position 205 and extended toward piston 136 (and away from cylinder head 18) in second position 215. The pre-chamber sleeve 235 may comprise a tube shape with the central axis 299 passing through a geometric center thereof. The pre-chamber sleeve 235 may be manufactured as single piece integrally with pre-chamber cap 234. In other examples, the pre-chamber cap 234 and pre-chamber sleeve 235 may be separate pieces coupled together via welds, fusions, adhesives, threading, one or more interlocking features, or the like. In the example shown, an upper portion of the pre-chamber sleeve 235 is encircled by pre-chamber body 202, with an outer surface of pre-chamber sleeve 235 having a smaller diameter than interior surface 231 of pre-chamber body 202.

A material of the pre-chamber cap 234 and/or the pre-chamber sleeve 235 may be cast iron, stainless steel, aluminum, carbon fiber, magnesium, or the like. The material of the pre-chamber cap 234 and/or the pre-chamber sleeve 235 may be similar to or different than a material of the pre-chamber body 202.

The pre-chamber sleeve 235 may include a plurality of first openings 242 proximate to the pre-chamber cap 234. Herein, the plurality of first openings 242 may be interchangeably referred to as the plurality of lower openings 242. The plurality of lower openings 242 may include a plurality of shapes including circular, oblong, triangular, rectangular, and the like. The plurality of lower openings 242 may be circular openings extending through an entire thickness of the pre-chamber sleeve 235. The plurality of lower openings 242, additionally or alternatively, may be slits. For example, the slits may have a height similar to the thickness of pre-chamber sleeve 235 and widths (e.g., dimension perpendicular to central axis 299) 2 to 5 times larger than the height.

The first pre-chamber system 200 further includes an electrode 204 encased in insulation 206. Electrode 204 may be a cylindrical electrode positioned to be coaxial with central axis 299, and insulation 206 may be a hollow cylinder coaxial with central axis 299. Further, an inner radius of insulation 206 may be approximately equal to an outer radius of electrode 204 so that an inner surface of insulation 206 is in direct contact with an outer surface of electrode 204. An outer radius of insulation 206 may be smaller than an inner radius of pre-chamber sleeve 235, resulting in a radial gap between insulation 206 and pre-chamber sleeve 235. The radial gap between pre-chamber body 202 and insulation 206 may at least partially define a hollow annular cavity, in which in the interior volume 203 is arranged, forming pre-chamber 188.

Further, as shown in FIGS. 2A and 2B, first pre-chamber system 200 includes pre-chamber igniter 192 that has a ground electrode 246, which is coupled to the interior surface 231 of pre-chamber body 202. As such, ground electrode 246 is coupled to an electrical ground via pre-chamber body 202. Further, in the example shown, ground electrode 246 extends into pre-chamber 188 and overlaps with a horizontal position of a center electrode 244. A vertical gap between ground electrode 246 and center electrode 244 forms a spark gap 240, which is positioned entirely within interior volume 203. The spark gap 240 may not increase in size as the position of the pre-chamber 188 is adjusted between the first position 205 and the second position 215. In the example shown, ground electrode 246 extends into the interior volume 230 of pre-chamber 188 via a slot 250 in pre-chamber sleeve 235. Slot 250 may be sized to enable pre-chamber sleeve 235 and pre-chamber cap 235 to move between first position 205 and second position 215 without contacting the ground electrode 246, for example. Further, slot 250 may be actuated to a sufficient magnitude for cylinder gases to flow therethrough and into the interior volume 203. Thus, the interior volume 203 of pre-chamber 188 may not be fluidically coupled to cylinder 130 via the slot 250.

Pre-chamber cap 234 and pre-chamber sleeve 235 may be movable along central axis 299 between first position 205 (FIG. 2A) and second position 215 (FIG. 2B) via an actuator 225. For example, actuator 225 may adjust the position of pre-chamber cap 234 and pre-chamber sleeve 235 in a direction that is parallel to central axis 299, into and out of the cylinder 130. Actuator 225 may be a solenoid, an electric motor, a pneumatic actuator, a vacuum actuator, a hydraulic actuator, or the like. Actuator 225 may be directly coupled to pre-chamber sleeve 235, and may thereby act directly on pre-chamber sleeve 235 or may be indirectly coupled via a linkage, a cam, etc. In the example shown, pre-chamber sleeve 235 is coupled to actuator 225 via a linkage 227, and thus, movement of the linkage may be transferred to pre-chamber sleeve 235. In the example of the first pre-chamber system 200, actuator 225 may adjust pre-chamber sleeve 235 between two or more distinct positions including a first position 205 and a second position 215 to adjust an orifice opening size. In some examples, actuator 225 may continuously vary the position of pre-chamber sleeve 235 between the first position 205 and the second position 215 based on engine conditions, such as an engine load, to adjust the orifice opening size. Actuator 225 may move (e.g., slide) pre-chamber sleeve 235 linearly in the orientation shown in FIGS. 2A and 2B parallel to the central axis 299. In alternative embodiments, pre-chamber cap 234 may be movable in a non-linear fashion. For example, pre-chamber sleeve 235 may pivot, rotate, fold, coil, or the like between two or more positions as described in greater detail below.

In the example of the first pre-chamber system 200, the interior volume 203 may be smaller when pre-chamber 188 is in the first position 205 and larger when pre-chamber 188 is in the second position 215. For example, the interior volume 203 may be the smallest when pre-chamber 188 is in first position 205, which may be a fully retracted position of pre-chamber 188, and the largest when pre-chamber 188 is in second position 215, which may be a fully extended position of pre-chamber 188. As such, a distance 282 between the inner surface 236 of pre-chamber cap 234 and the ground electrode 246 (e.g., at a position along central axis 299) is smaller (e.g., smallest) in first position 205 (FIG. 2A) and larger (e.g., largest) in second position 215 (FIG. 2B).

A plurality of second openings 238 may be arranged on pre-chamber sleeve 235. Herein, the plurality of second openings 238 may be interchangeably referred to as the plurality of upper openings 238. The plurality of upper openings 238 may be similar to lower openings 242 in one or more of size and shape. The plurality of upper openings 238 may be shaped similarly to or differently than the plurality of lower openings 242. In one example, a size of the plurality of upper openings 238 may be greater than, less than, or equal to a size of the plurality of lower openings 242. In one example, cross-sectional flow through areas of the plurality of lower openings 242 and/or the plurality of upper openings 238 may be non-uniform such that a restriction is arranged therein. The restriction may generate a vacuum which under some conditions, may promote gas flow into or out of the interior volume 203 of the pre-chamber 188. In one example, the restriction may be similar to a venturi shape.

The plurality of upper openings 238 are located above the plurality of lower openings 242, closer to the cylinder head 18. The plurality of upper openings 238 may be blocked by interior surface 231 and may not fluidly couple interior volume 203 of pre-chamber 188 to cylinder 130 by pre-chamber cap 234 being in the first position 205. The plurality of upper openings 238 may be exposed in the second position 215 as a result of an actuation of the pre-chamber cap 234 and the pre-chamber sleeve 235 moving the plurality of upper openings 238 away from the cylinder head 18 and out of a boundary of the interior surface 231.

Each opening of the plurality of lower openings 242 and the plurality of upper openings 238 may provide a fluid connection between interior volume 203 of the pre-chamber 188 and the cylinder 130. Thus during the compression stroke, a mixture, which may include one or more of intake air, exhaust gas recirculate (EGR), fuel, and combustion byproducts, may flow into pre-chamber 188 from cylinder 130 via the plurality of lower openings 242 and/or the plurality of upper openings 238 (e.g., due to a pressure difference across the plurality of lower openings 242 and the plurality of upper openings 238), where it may be ignited via a spark at spark gap 240. The hot gas/flame jets may then flow out of pre-chamber 188 to cylinder 130 via the plurality of lower openings 242 and the plurality of upper openings 238. In particular, the smaller orifice opening size of pre-chamber 188 in first position 205 (see FIG. 2A) may provide enhanced ignition at higher loads. As such, the first position 205 may provide a more robust ignition for combustion in cylinder 130 at higher loads, which may result in increased cylinder power and fuel savings. However, the smaller orifice opening size of pre-chamber 188 in first position 205 may not provide enhanced combustion characteristics at lower loads. Therefore, the larger orifice opening size of pre-chamber 188 of the second position 215 may be desired during lower loads as the larger orifice opening size may provide enhanced ignition.

Furthermore, by adjusting the orifice opening size, flow rates into the interior volume 203 may be enhanced for various engine conditions while maintaining combustion stability. For example, during higher loads, more air and fuel may be arranged in the cylinder 130. As such, a smaller orifice opening area may be used while still providing a desired amount of air and fuel to the interior volume 203 of the pre-chamber 188 to generate a desired flame jetting. During lower loads, less air and fuel may be arranged in the cylinder 130. Furthermore, thermal stresses on the pre-chamber igniter 192 may be reduced. As such, a larger orifice opening area may be used to provide the desired amount of air and fuel to the interior volume 203 of the pre-chamber 188.

Additionally, at lower loads, a flame kernel produced by the pre-chamber ignitor 192 may not be stable due to increased amounts of residual burned gas within the interior volume 203 of the pre-chamber 188. If the orifice opening size is small (e.g., when the pre-chamber cap 234 is in a second position 215), the flame kernel may be quenched (e.g., extinguished) as the flame kernel passes through the small orifice openings. However, with increased orifice opening size (e.g., when the pre-chamber cap 234 is in a first position 205), an increased amount of fresh air from the cylinder 130 may enter an interior volume 203 of the pre-chamber 188 during the compression stroke of a four stroke engine cycle. Thus, the flame kernel may have increased stability within the interior volume 203 of pre-chamber 188. Furthermore, increased orifice opening sizes decrease the probability of the flame kernel from quenching as the flame flows through the orifice. At higher loads, stability of the flame kernel is increased due to increased gas pressures and increased temperatures. The probability of quenching is also decreased as the temperature of a material (e.g., metal) the pre-chamber cap 234 and pre-chamber sleeve 235 is increased. The small orifice sizes may further contribute to more robust flame jets at higher loads, which may promote enhanced combustion in the cylinder 130.

Figure 3A:
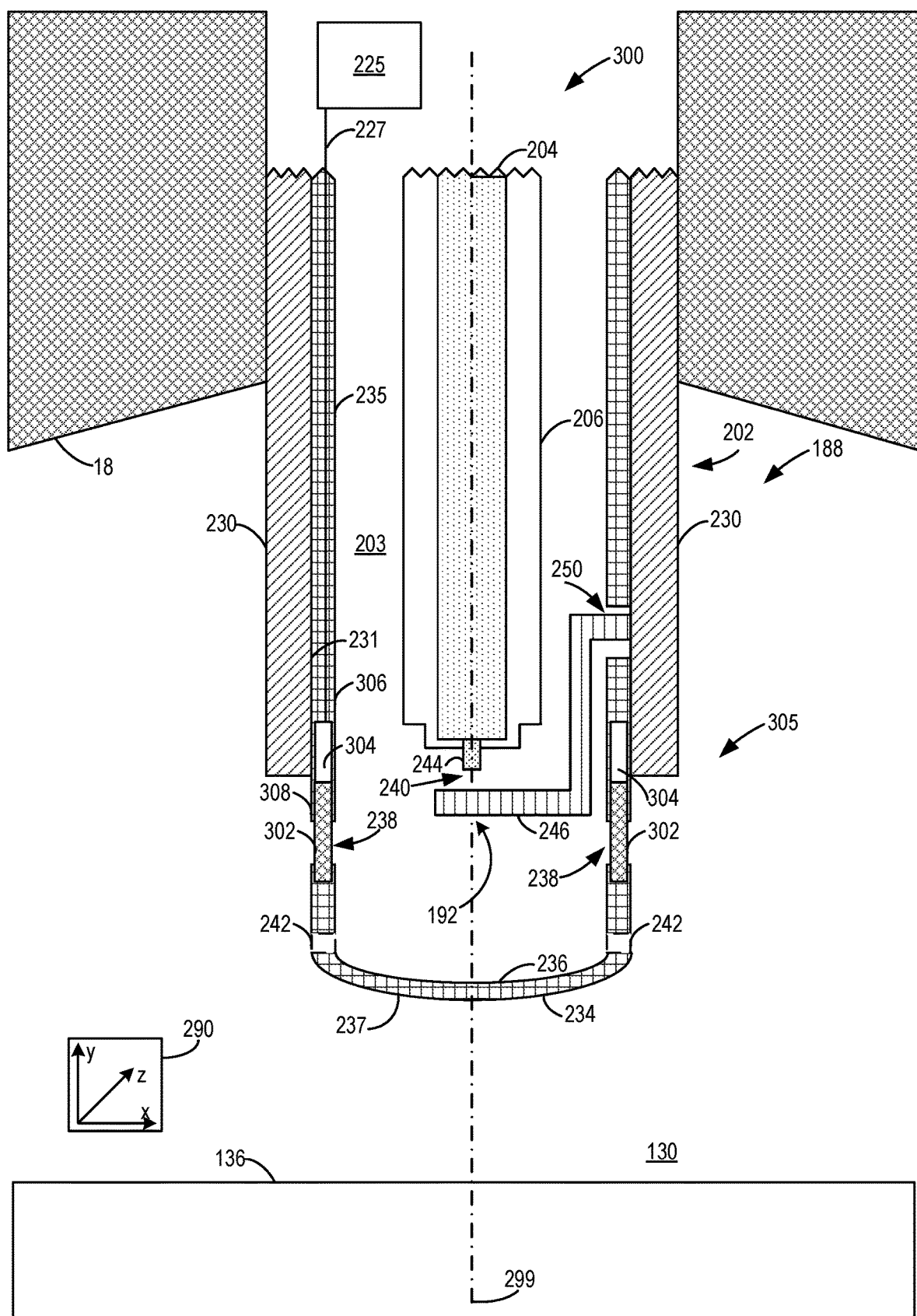
FIG. 3A schematically shows a detailed view of a second pre-chamber system with shutters in a first position.
Figure 3B:
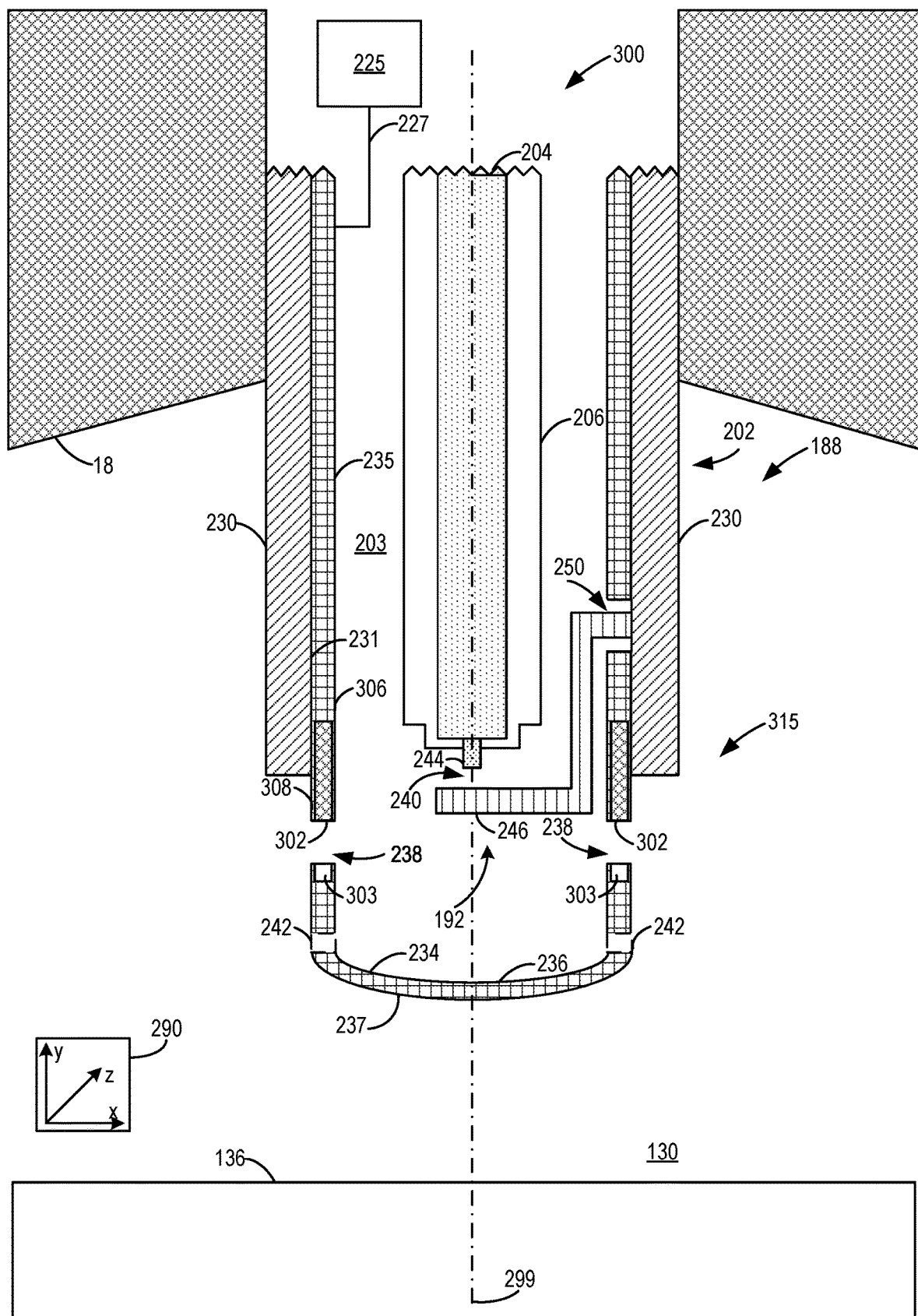
FIG. 3B schematically shows a detailed view of the second pre-chamber system with shutters in a second position.

Turning to FIGS. 3A and 3B, they show symmetrical cross-sectional views of a second pre-chamber system 300, which may be one example of pre-chamber 188 introduced in FIG. 1. FIGS. 3A and 3B introduce new parts that may change function of existing parts and will be described in tandem below. For example, the pre-chamber cap 234 and the pre-chamber sleeve 235 may be fixed in second pre-chamber system 300. A distance between the pre-chamber igniter 192 and the pre-chamber cap 234 may be fixed, unlike in the first pre-chamber system 200 of FIGS. 2A and 2B, such that the interior volume 203 of the pre-chamber 188 is fixed.

The second pre-chamber system 300 may include a plurality of shutters 302 configured to adjust an opening size of the plurality of upper openings 238. In particular, FIG. 3A shows second pre-chamber system 300 with the plurality of shutters 302 in a first position 305, where the plurality of upper openings 238 are sealed by the plurality of shutters 302, and FIG. 3B shows second pre-chamber system 300 with the plurality of shutters 302 in a second position 315, where the plurality of shutters 302 is within a shutter housing 304 and the plurality of upper openings 238 are fluidically coupled to cylinder 130. In one example, the first position 305 includes where the plurality of upper openings 238 are hermetically sealed via the plurality of shutters 302.

For example, the plurality of shutters 302 may be rectangular in shape and have a thickness smaller than a thickness of pre-chamber sleeve 235. Thus, the plurality of shutters 302 may fit within walls of the pre-chamber sleeve 235. The pre-chamber sleeve 235 includes an outer surface 308 and an inner surface 306 between which the plurality of shutters 302 are arranged. As an example, outer surface 308 may be a surface of the pre-chamber sleeve 235 exposed to the volume of the cylinder 130 or touching interior surface 231 of pre-chamber body 202. Inner surface 306 may be a surface of pre-chamber sleeve 235 exposed to the interior volume 203 of the pre-chamber 188. A length and a width of the plurality of shutters 302 is larger than the plurality of upper openings 238. Thus, when the plurality of shutters 302 are in the first position 305 of FIG. 3A, the plurality of shutters 302 fully block the plurality of upper openings 238 so that the plurality of upper openings 238 may not fluidly couple pre-chamber 188 to cylinder 130. That is to say, the plurality of upper openings 238 are sealed when the plurality of shutters 302 are in the first position.

The plurality of shutters 302 may be linearly movable along central axis 299 between first position 305 (FIG. 3A) and second position 315 (FIG. 3B) via actuator 225. For example, actuator 225 may adjust the position of the plurality of shutters 302 by sliding the plurality of shutters 302 in a direction that is parallel to central axis 299. In the example shown, the plurality of shutters 302 may be coupled to actuator 225 via linkage 227, and thus, actuator 225 may cause the plurality of shutters 302 to move by actuating the linkage 227. For example, the linkage 227 may traverse through or adjacent to the pre-chamber sleeve 235. In other examples, linkage 227 may travel along the inner surface 306 of pre-chamber sleeve 235 parallel to central axis 299. The actuator 225 may adjust the plurality of shutters 302 between two or more distinct positions including first position 305 and second position 315. In some examples, actuator 225 may continuously vary the position of the plurality of shutters 302 between first position 305 and second position 315 to adjust an opening of the plurality of upper openings 238 between a fully open position, a fully closed position, or a position therebetween. In one example, the linkage is a single linkage such that each shutter of the plurality of shutters 302 are adjusted in tandem. As another example, the linkage may be a single linkage of a plurality of linkages such that each of the shutters of the plurality of shutters 302 may be adjusted individually.

When the plurality of shutters 302 are in second position 315 (FIG. 3B), the plurality of shutters 302 are housed within shutter housing 304 shown in FIG. 3A. Shutter housing 304 may be a hole (e.g., a cut-out) within the pre-chamber sleeve 235 with a thickness smaller than the thickness of the pre-chamber sleeve 235. When the plurality of shutters 302 is moved at least partially out of shutter housing 304 and into a lower recess 303, the surfaces of the plurality of shutters 302 may block the plurality of upper openings 238. The plurality of shutters 302 may be shaped to be in face-sharing contact with interior surfaces of the shutter housing 304 and/or the lower recess 303 based on the first position 305 and the second position 315. By fitting tightly within shutter housing 304 and lower recess 303, the plurality of shutters 302 may act as a barrier for air, gases, flames, etc. flowing between cylinder 130 and pre-chamber 188 when in first position 305. For example, when in first position 205, a portion of the plurality of shutters 302 are within the shutter housing 304, a portion of the plurality of shutters 302 is exposed, and another portion is positioned in a lower recess 303, which is shown in FIG. 3B. Lower recess 303 is similar in shape to shutter housing 304 but is smaller in length, thereby only receiving a portion of each of the plurality of shutters 302. In this way, with shutters in first position 305, shutter housing 304 and lower recess 303 may form a tight seal with the plurality of shutters 302 to block fluid coupling between the cylinder 130 and the pre-chamber 188.

Controller 12, as shown in FIG. 1, may signal to actuator 225 depending on an engine load to adjust an orifice opening size. For example, controller 12 may refer to a look-up table having the engine speed and load as an input and output a desired position for one or more of the plurality of shutters 302. For example, controller 12 may determine a low engine load is present and may signal to actuator 225 to move the plurality of shutters 302 to the second position 315, which may increase the orifice opening size and increase combustion performance. Alternatively, controller 12 may signal to actuator 225 to move the plurality of shutters 302 to the first position 305 during a high load, to enhance combustion performance.

Figure 4A:
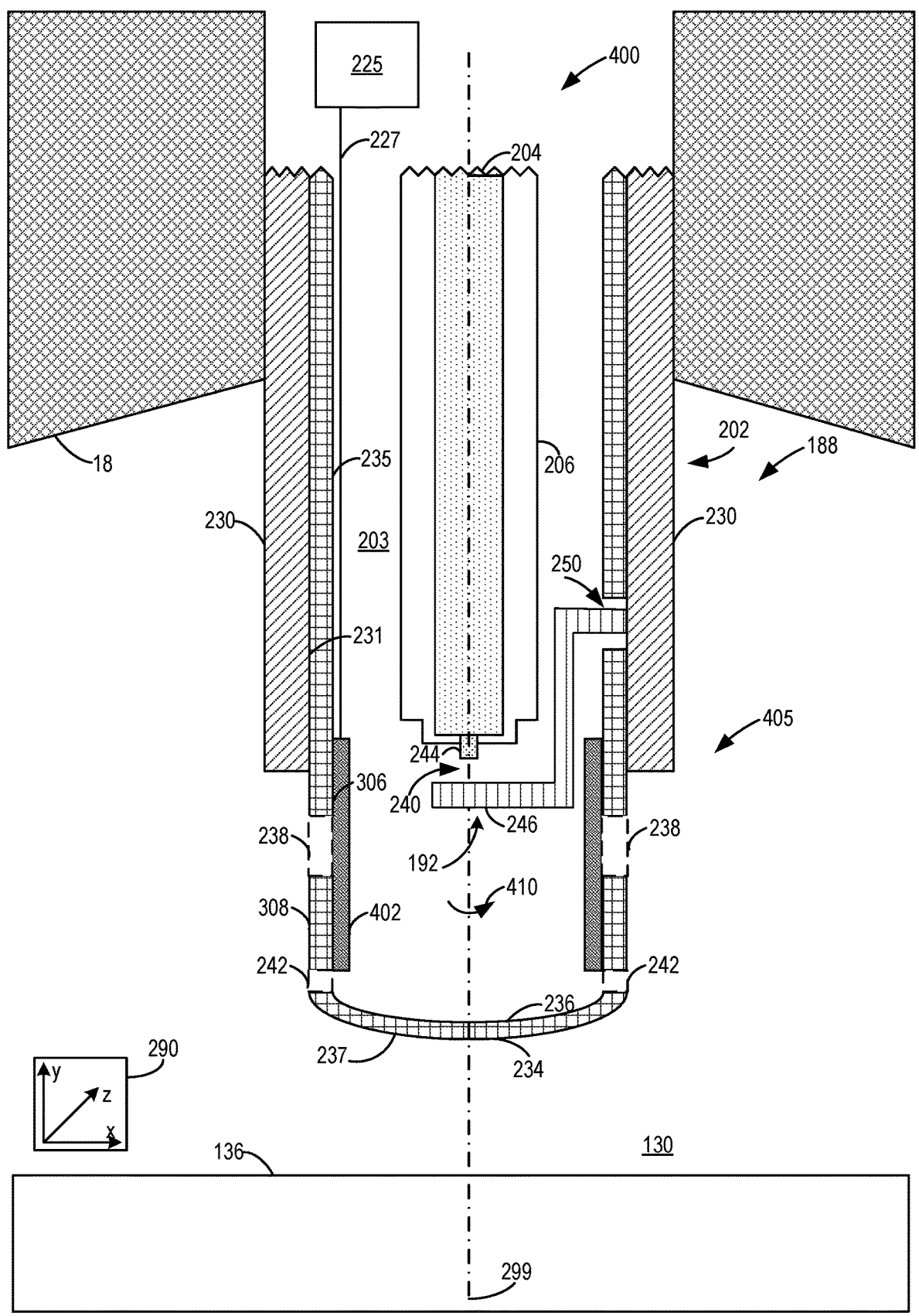
FIG. 4A schematically shows a detailed view of a third pre-chamber system with a rotating cylinder with windows in a first position.
Figure 4B:
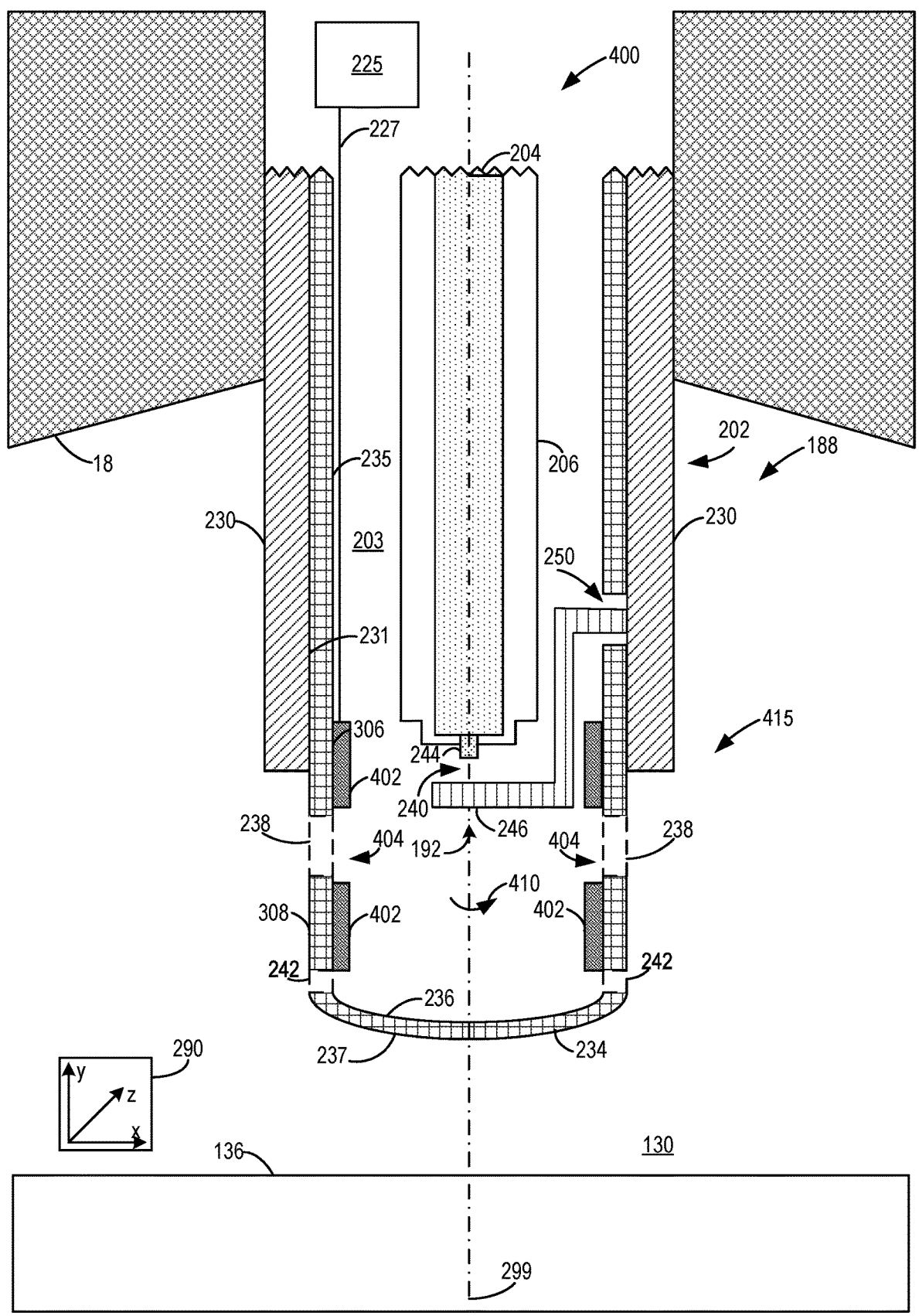
FIG. 4B schematically shows a detailed view of the third pre-chamber system with the rotating cylinder with windows in a second position.

Turning now to FIGS. 4A and 4B, symmetrical cross-sectional views of a third pre-chamber system 400, which may be one example of pre-chamber 188 introduced in FIG. 1, are shown. FIGS. 4A and 4B introduce new parts that may change function of existing parts and will be described below. For example, pre-chamber cap 234 may not move linearly in the third pre-chamber system 400 to adjust an orifice opening size. The third pre-chamber system 400 may include a rotatable tube 402 configured to adjust an opening size of the plurality of upper openings 238 by adjusting an alignment of a plurality of openings 404 located on the rotatable tube 402 with the plurality of upper openings 238. Further, FIGS. 4A and 4B are substantially identical except for the position of rotatable tube 402, wherein FIG. 4A shows third pre-chamber system 400 with rotatable tube 402 in a first position 405 and FIG. 4B shows third pre-chamber system 400 with rotatable tube 402 in a second position 415. The first position 405 may include where the plurality of upper openings 238 are not aligned with the plurality of openings 404 of rotatable tube 402, thereby reducing an opening area of the plurality of upper openings 238. Additionally or alternatively, the first position 405 may comprise where the plurality of upper openings 238 may be fully sealed due to a full misalignment with the plurality of openings 404. The second position 415 may include where the plurality of openings 404 on rotatable tube 402 are aligned with the plurality of upper openings 238, thereby increasing the opening area of the plurality of upper openings 238.

The rotatable tube 402 may be sized to adjust the opening area of the plurality of upper openings 238. In one example, the opening area corresponds to a flow-through area of the plurality of upper openings. Thus, if the opening area is reduced, then the flow-through area of the plurality of upper openings is also reduced. In one example, the rotatable tube 402 may extend from a region of the pre-chamber sleeve 235 above the plurality of upper openings 238 to a region of the pre-chamber sleeve 235 between the plurality of lower openings 242 and the plurality of upper openings 238. In this way, the rotatable tube 402 may not adjust an opening size of the plurality of lower openings 242. In one example, it may be desired to decrease a size (e.g., a length and a thickness) of the rotatable tube 402 to decrease a packaging size of the pre-chamber 188. The rotatable tube 402 may be touching inner surface 306 of pre-chamber sleeve 235. By touching inner surface 306, rotatable tube 402 may form a seal with pre-chamber sleeve 235 such that air, gases, flames, etc. may not be between the touching surfaces of rotatable tube 402 and inner surface 306.

The rotatable tube 402 may be rotationally movable around central axis 299 as depicted by arrow 410. Actuator 225, via linkage 227 which is coupled to the rotatable tube 402, may rotate the rotatable tube 402 in response to a signal from a controller (e.g., controller 12 of FIG. 1). In the example shown in FIGS. 4A and 4B, arrow 410 is rotating counterclockwise as viewed from a top-down view (e.g., from the top of pre-chamber 188 toward piston 136) of the cylinder. In other examples, arrow 410 may move clockwise as viewed from the top-down view or may be able to rotate both clockwise and counterclockwise (e.g., pivot).

Figure 4C:
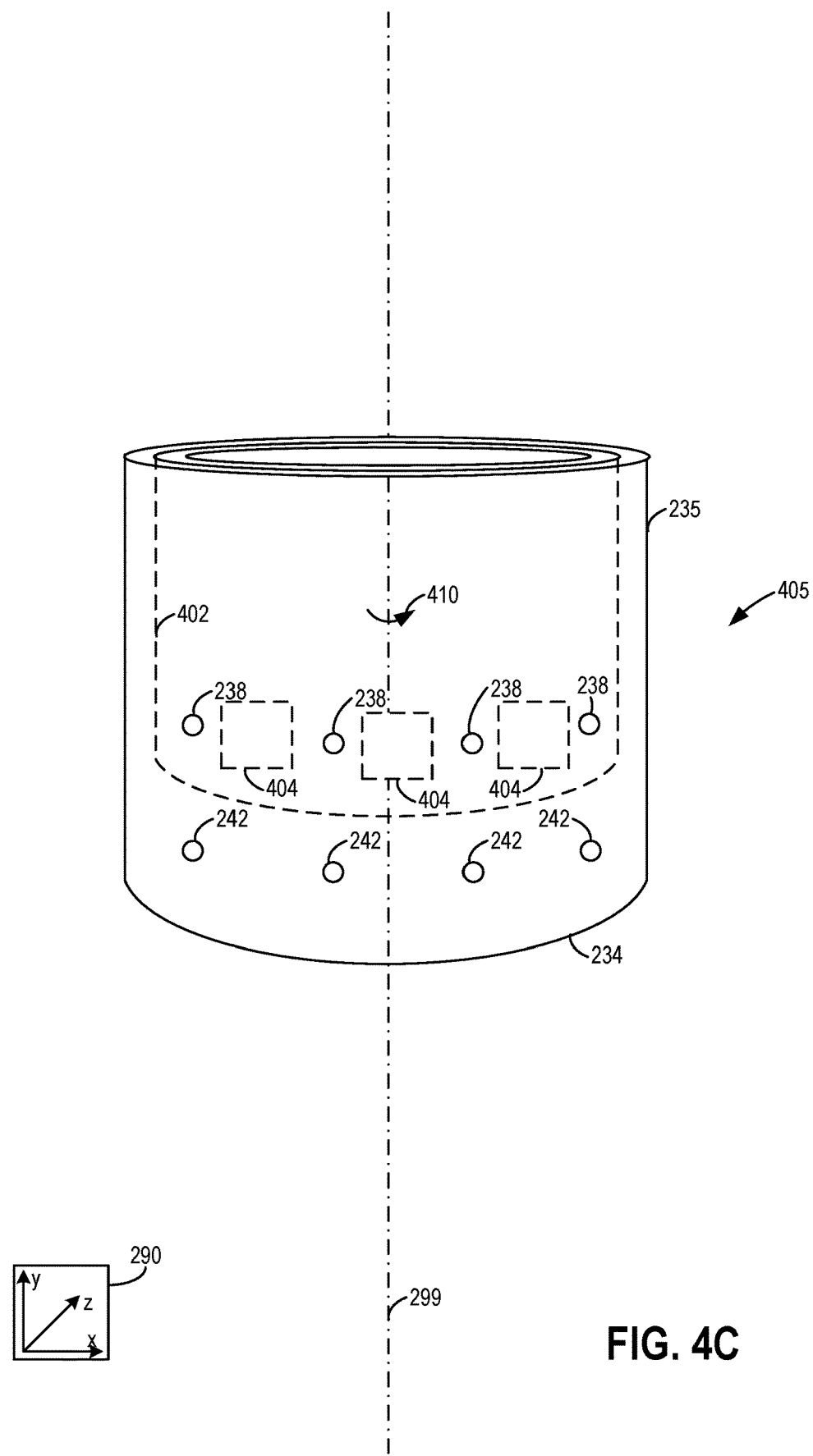
FIG. 4C schematically shows a semi-transparent view of the third pre-chamber system with the rotating cylinder in the first position.

The plurality of openings 404 may be larger (e.g., greater in diameter, length, and/or width) than the plurality of upper openings 238 on pre-chamber sleeve 235 and may be square, rectangular, or circular orifices. In first position 405 (FIG. 4A), the plurality of openings 404 and the plurality of upper openings 238 are misaligned. When the plurality of openings 404 and the plurality of upper openings 238 are misaligned, an additional example of which is shown in FIG. 4C, rotatable tube 402 blocks the plurality of upper openings 238 such that the plurality of upper openings 238 do not fluidically couple cylinder 130 to pre-chamber 188. In second position 415 (FIG. 4B), the plurality of openings 404 and the plurality of upper openings 238 are aligned with each other. When the plurality of openings 404 and the plurality of 238 are aligned, an opening between pre-chamber 188 and cylinder 130 is formed, fluidically coupling pre-chamber 188 to cylinder 130. Additionally, the plurality of openings 404 and the plurality of upper openings 238 may be in a position anywhere between aligned and unaligned such that an opening is formed between cylinder 130 and pre-chamber 188, but the opening is smaller in area than when the plurality of openings 404 and the plurality of upper openings 238 are fully aligned.

Continuing now to 4C, an example of third pre-chamber system 400 is shown in a semi-transparent schematic drawing. FIG. 4C further illustrates a misalignment between the plurality of upper openings 238 and the plurality of openings 404 in the first position 435. Dashed lines indicate a surface that is not visible in this view while solid lines indicate a visible part. In first position 405, the plurality of openings 404 (shown as dotted squares in FIG. 4C) are not aligned with the plurality of upper openings 238 (shown as circles). Although not shown, when in second position 415, the plurality of upper openings 238 and the plurality of openings 404 may be overlapping (small circles over the dotted squares). As illustrated, a diameter along with the plurality of openings 404 are located may be above the plurality of lower openings 242 such that the plurality of openings 404 and the rotatable tube 402 may not adjust an opening size of the plurality of lower openings 242.

In this way, FIGS. 4A to 4C illustrate an embodiment of a pre-chamber where a rotatable element is concentrically arranged within the pre-chamber. The rotatable element comprises features that may adjust an opening size of the pre-chamber based on conditions. The rotatable element may be rotated to align features (e.g., openings) thereof with a group of openings of the pre-chamber to increase the opening size of the pre-chamber, thereby allowing a greater amount of air and fuel to flow therein. As another example, the rotatable element may be rotated to misalign features thereof with the group of openings to decrease the opening size of the pre-chamber, thereby reducing an amount of air and fuel flowing therein. In some examples, the rotatable element may be adjusted to positions where the features are partially aligned/misaligned with the group of openings to further modify air and fuel flow into the pre-chamber.

Figure 5A:
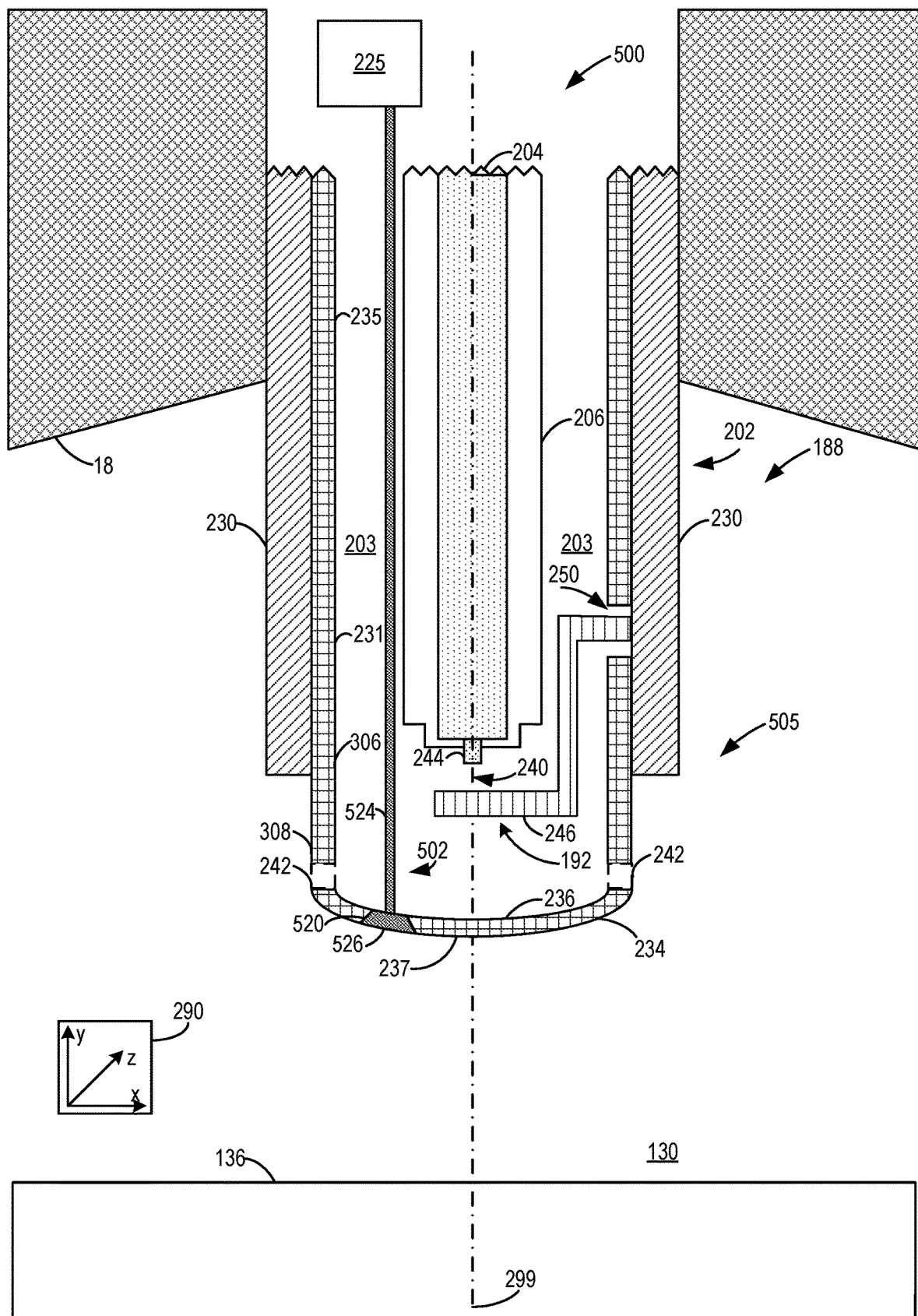
FIG. 5A schematically shows a detailed view of a fourth pre-chamber system with a poppet valve in a first position.
Figure 5B:
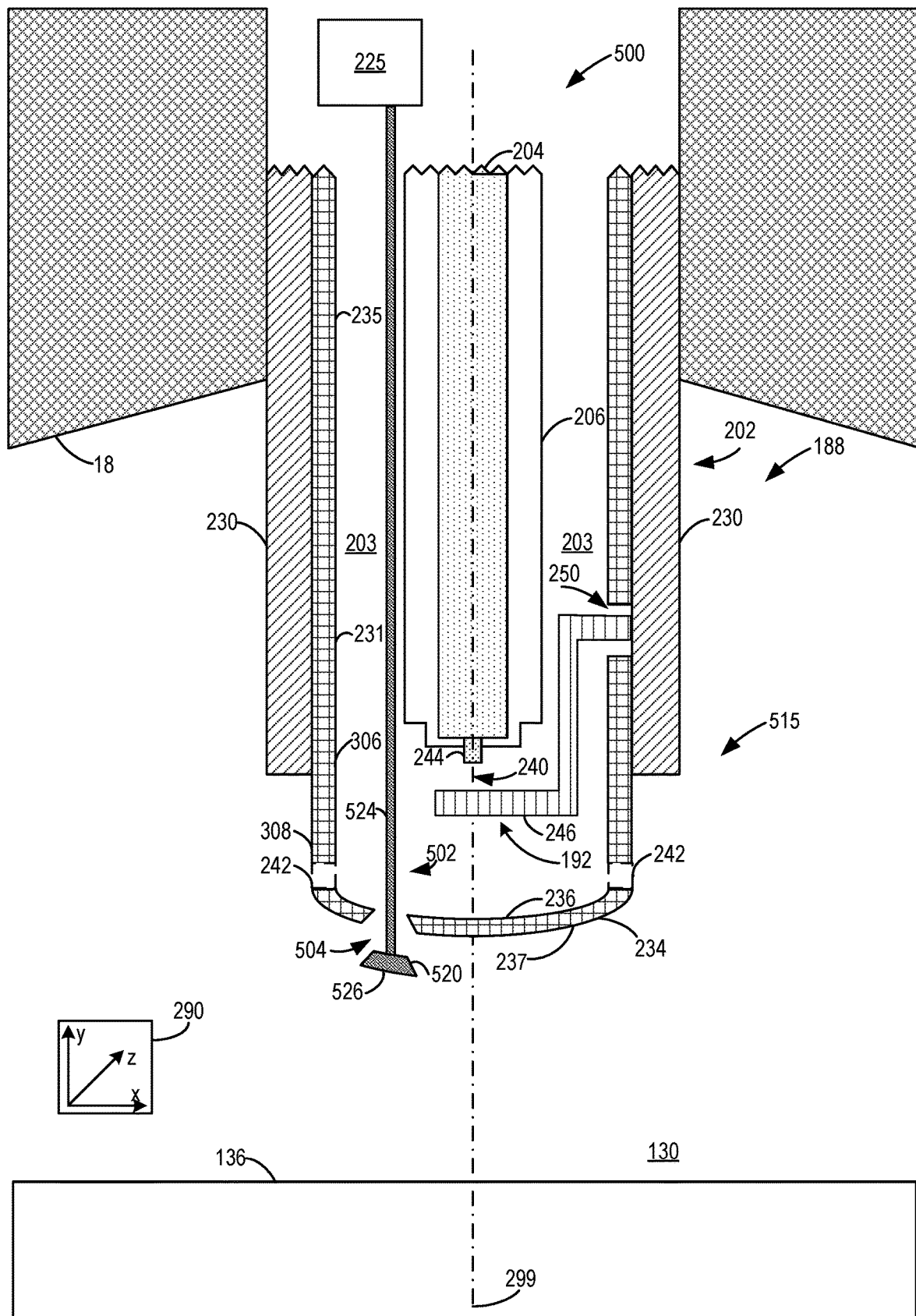
FIG. 5B schematically shows a detailed view of the fourth pre-chamber system with the poppet valve in a second position.

Moving now to FIGS. 5A and 5B, symmetrical cross-sectional views of a fourth pre-chamber system 500, which may be one example of pre-chamber 188 introduced in FIG. 1 with the interior volume 203, are shown. FIGS. 5A and 5B introduce new parts that may change function of and/or replace existing parts and will be described below. For example, pre-chamber cap 234 may be fixed in fourth pre-chamber system 500. A valve 502 may be configured to adjust an orifice opening size of the fourth pre-chamber system 500. In one example, the valve 502 is a poppet valve and may adjust an opening 504 (shown in FIG. 5B) of the pre-chamber cap 234. Further, FIGS. 5A and 5B are substantially identical except for the position of valve 502 and will be described collectively. In particular, FIG. 5A shows fourth pre-chamber system 500 with valve 502 in a first position 505, where opening 504 is sealed by valve 502, and FIG. 5B shows fourth pre-chamber system 500 with valve 502 in a second position 515, where opening 504 fluidically couples cylinder 130 and pre-chamber 188. In one example, the valve 502 is the only moveable portion of the fourth pre-chamber system 500.

Valve 502 includes a stem 524 and a head 526. The shape of stem 524 may be cylindrical, rectangular, or the like. Stem 524 may be parallel to the pre-chamber sleeve 235 and central axis 299, and a length of stem 524 may be similar to a length of the pre-chamber sleeve 235 as stem 524 connects from actuator 225 to head 526, which may be embedded within pre-chamber cap 234 when in a first position 505. Head 526 may have edges 520 that are angled with respect to stem 524 and configured to be in face-sharing contact with a valve seat when in the first position 505. For example, edges 520 may be angled such that edges 520 are 40 to 45 degrees, 50 to 55 degrees, or 60 to 65 degrees away from stem 524. In this way, head 526 may not be able to enter the interior volume 203 of the pre-chamber 188.

Additionally or alternatively, the opening 504 may include a seat or other retention mechanism that presses against the head 526 of valve 502 when the valve 502 is in the first position 505. The retention mechanism may include a diameter smaller than a diameter of the head 526 such that the head 526 may not traverse the retention mechanism and enter the interior volume 203 of the pre-chamber 188. The head 526 is coupled to stem 524 and may be circular, rectangular, oblong, square, or the like. In an alternate embodiment, head 526 may move opposite from the direction shown, so that it opens toward the inside of the pre-chamber.

Stem 524 may be mechanical coupled to actuator 225 (e.g., linkage 227 may not be included within fourth pre-chamber system 500), allowing actuator 225 to move valve 502 into a position including the first position 505, the second position 515, or a position therebetween. Outside of the first position 505, the opening 504 may be fully open. However, a distance between the opening 504 and the head 526 may correspond to an effective opening size of the opening 504. For example, when the valve 502 is in a more closed position, the head 526 may be closer to the opening 504 than in the second position 515. As such, the head 526 in the more closed position may still block some amount a mixture from entering the interior volume 203.

In this way, FIGS. 5A and 5B illustrate an example embodiment of a pre-chamber comprising a valve integrally arranged therein. A position of the valve may be adjusted from a fully closed position to a fully open position or a position therebetween. In one example, as the valve moves further from a valve seat, an opening area of the pre-chamber increases, wherein the opening area is a maximum opening area when the valve is in the fully open position.

Figure 6A:
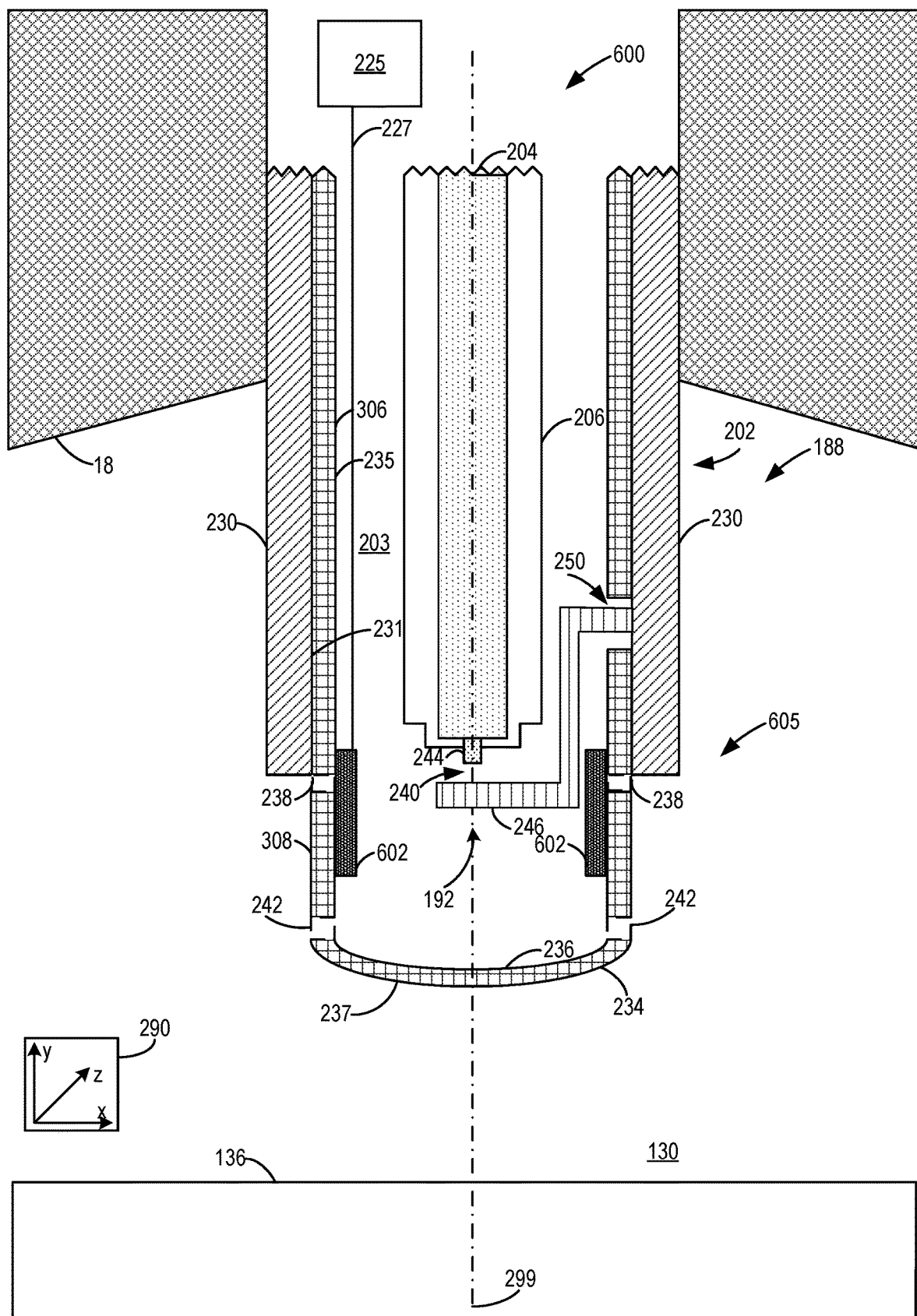
FIG. 6A schematically shows a detailed view of a fifth pre-chamber system with a shutter in a first position.
Figure 6B:
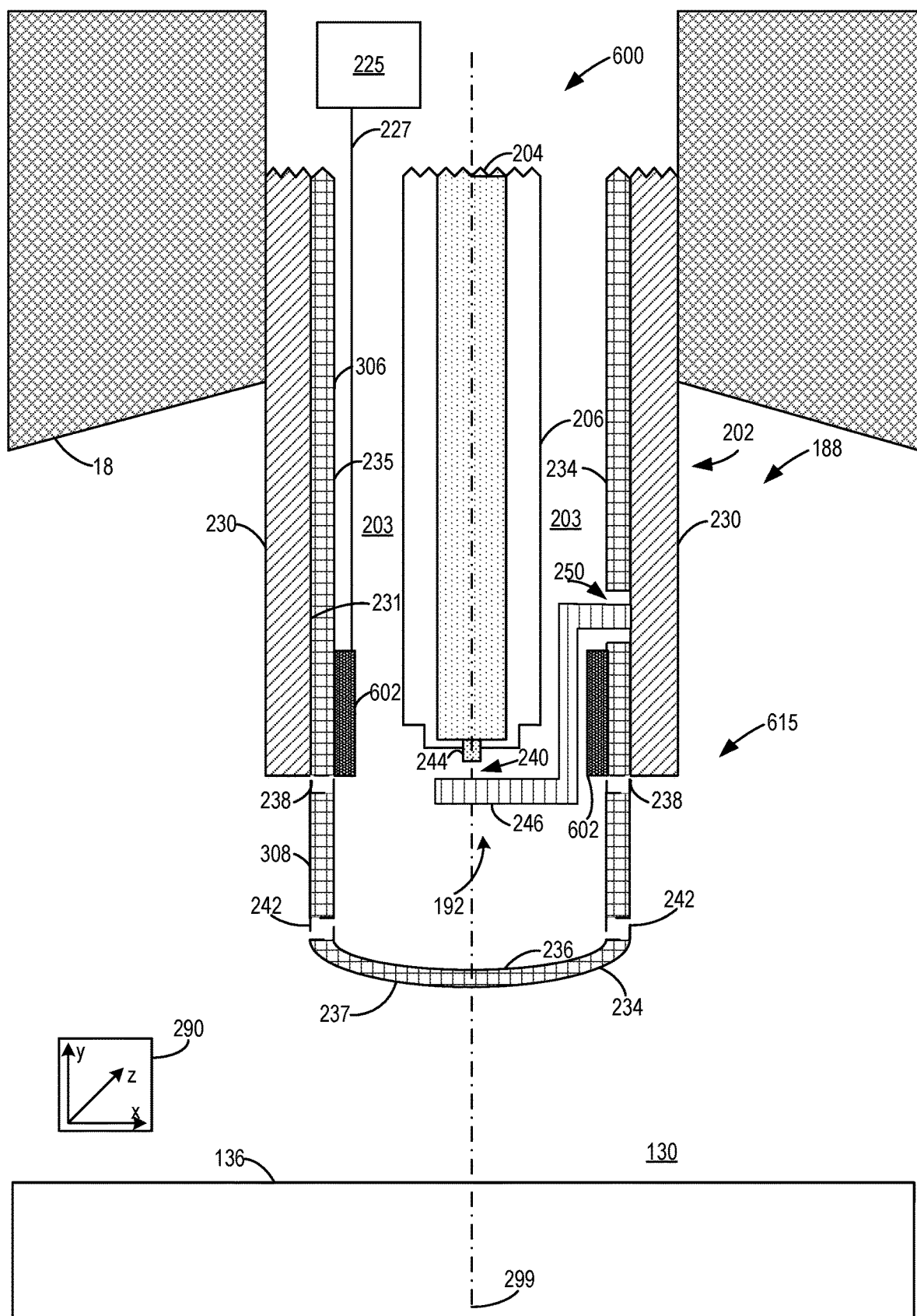
FIG. 6B schematically shows a detailed view of the fifth pre-chamber system with the shutter in a second position.

Turning now to FIGS. 6A and 6B, symmetrical cross-sectional views of a fifth pre-chamber system 600, which may be one example of pre-chamber 188 introduced in FIG. 1 with the interior volume 203, are shown. In one example, the fifth pre-chamber system 600 is substantially identical to the second pre-chamber system 300 of FIGS. 3A and 3B, except that shutters of the fifth pre-chamber system 600 are arranged outside of the pre-chamber sleeve 235. FIGS. 6A and 6B may introduce new parts that may change function of and/or replace existing parts and will be describe below. For example, pre-chamber cap 234 may be fixed in the fifth pre-chamber system 600. The fifth pre-chamber system 600 may include a shutter 602 that may move linearly with respect to central axis 299 to adjust an opening size of the plurality of upper openings 238. The shutter 602 may comprise a tube shape. Further, FIGS. 6A and 6B are substantially identical except for the position of shutter 602 and will be described collectively. In particular, FIG. 6A shows fifth pre-chamber system 600 with shutter 602 in a first position 605, where the plurality of upper openings 238 are blocked by shutter 602. FIG. 6B shows fifth pre-chamber system 600 with shutter 602 in a second position 615, where the plurality of upper openings 238 fluidically couples cylinder 130 and to interior volume 203.

Shutter 602 may be flush with inner surface 306. Thus, when shutter 602 is in first position 605, the plurality of upper openings 238 do not allow flow of air, gases, fuel, etc. from cylinder 130 into interior volume 203. A material of the shutter 602 may be iron, stainless steel, aluminum, carbon fiber, magnesium, or the like. A thickness of shutter 602 may be similar to a thickness of pre-chamber sleeve 235, for example, or as another example, the thickness of shutter 602 may be less than the thickness of pre-chamber sleeve 235. A length of the shutter 602 may be less than a length of pre-chamber sleeve 235. For example, the length of shutter 602 may be 2.5 to 3 times smaller, 3 to 3.5 times smaller, or 3 to 4 times smaller than the length of pre-chamber sleeve 235. The length of the shutter 602 may be greater in length than that of the plurality of upper openings 238 such that shutter 602 may fully block the plurality of openings 238 when in the first position 605. By having the thickness of shutter 602 be similar or less than the thickness of pre-chamber sleeve 235 and having the length of the shutter 602 be less than the length of pre-chamber sleeve 235, shutter 602 may take up less volume within interior volume 203, decreasing packaging size of pre-chamber 188.

When in second position 615 shown in FIG. 6B, shutter 602 is not blocking the plurality of upper openings 238. The shutter 602 may be above the plurality of upper openings 238 when in second position 615 such that a surface of shutter 602 facing down toward piston 136 is above the plurality of upper openings 238, thus upper openings are fully unblocked by shutter 602. While unblocked, the plurality of upper openings 238 fluidly couple interior volume 203 to cylinder 130.

Shutter 602 may move between first position 605 and second position 615 by actuator 225. For example, actuator 225 may directly move shutter 602 linearly with respect to central axis 299 up towards actuator 225 to achieve second position 615. In other examples, linkage 227 may move shutter 602 after linkage 227 is actuated on by actuator 225. To achieve the first position 605 from the second position 615 or a position between first position 605 and second position 615, actuator 225 may activate linkage 227 to move shutter 602 down toward piston 136.

Figure 7A:
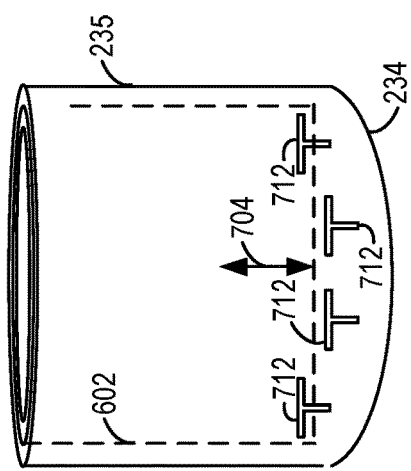
FIG. 7A shows an example pre-chamber with upper and lower openings.
Figure 7B:
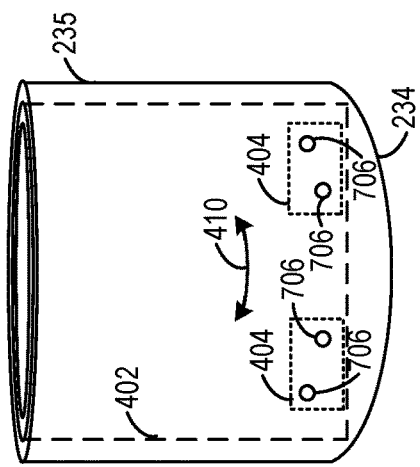
FIG. 7B shows an example pre-chamber with vertical slit openings.
Figure 7C:
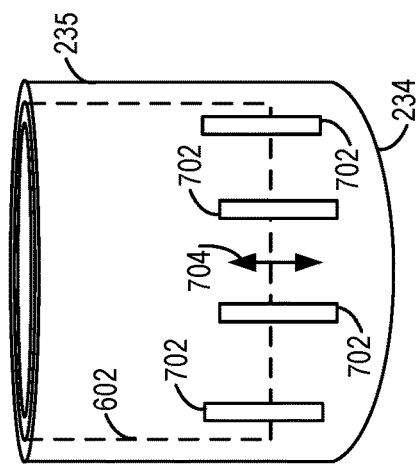
FIG. 7C show an example pre-chamber with horizontal openings connected to vertical openings.
Figure 7D:
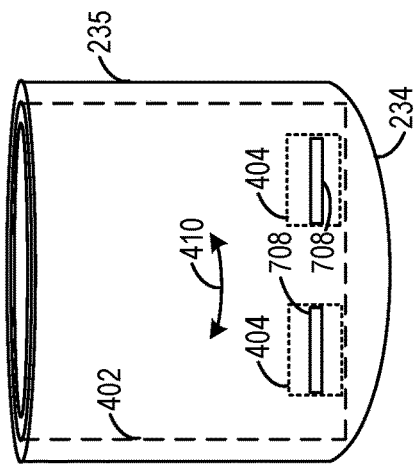
FIG. 7D shows an example pre-chamber with triangular openings.
Figure 7E:
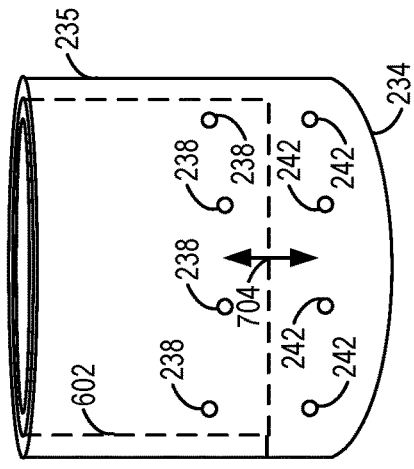
FIG. 7E show an example pre-chamber with horizontal slit openings.
Figure 7F:
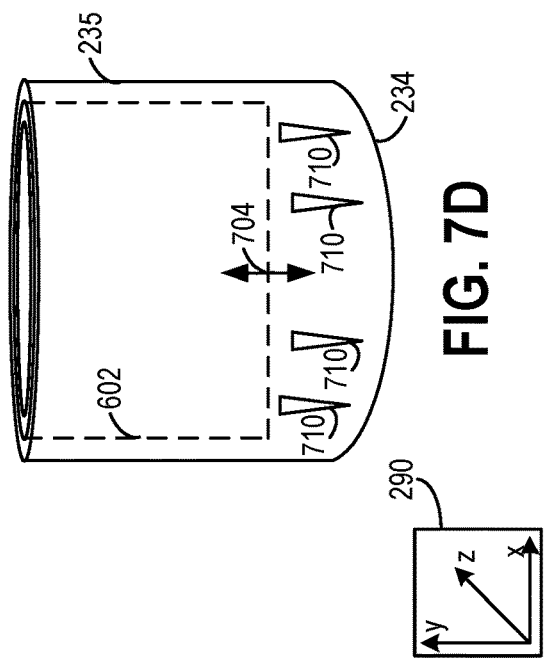
FIG. 7F shows an example pre-chamber with circular openings.

Turning now to FIGS. 7A-7F, a variety of example openings on the pre-chamber sleeve 235 are shown. Components previously introduced in FIGS. 1-6B are numbered the same in FIGS. 7A-7F and will not be reintroduced. FIGS. 7A-7D may be similar embodiments to FIGS. 6A and 6B in that they have shutter 602. FIGS. 7E and 7F may be similar embodiments to FIGS. 4A and 4B in that they include a rotatable feature. Parts that would otherwise be occluded from view are illustrated via dashed lines, and parts that are visible are marked by solid lines. As an example, shutter 602 is shown as dashed in FIGS. 7A-D since shutter 602 is within the interior volume 203.

Starting with FIG. 7A, the openings are a similar embodiment as described in FIGS. 6A and 6B. In this example, the plurality of upper openings 238 are circular with diameters 1.25 to 1.5, 1.5 to 1.75, or 1.75 to 2 times smaller than a thickness of pre-chamber sleeve 235. The plurality of lower openings 242 may have a similar diameter to that of the plurality of upper openings 238. Additionally shown in the example of FIG. 7A, the shutter 602 is in a position that covers the plurality of upper openings 238. The shutter 602 may move away and towards the pre-chamber cap as indicated by arrow 704. The shutter 602 may partially block, fully block, or not block the plurality of upper openings 238 based on the engine load. For example, for low to mid loads, the shutter 602 may fully uncover or partially cover the plurality of upper openings 238. As another example, at mid to high engine loads the shutter 602 may partially (e.g., cover half or more of the diameter of the plurality of upper openings 238) or fully cover (e.g., first position 605 shown in FIG. 6A) the plurality of upper openings 238.

Continuing now to FIG. 7B, an example pre-chamber sleeve 235 with slit openings 702 are shown. For example, the slit openings 702 may have lengths 2.5 to 3, 3 to 3.5, or 3.5 to 4 times smaller than a diameter of the shutter 602. As another example, a width of slit openings 702 may be 6 to 6.5, 6.5 to 7, or 7 to 7.5 times smaller than the length of slit openings 702. Slit openings 702 may vary in openness as shutter 602 is moved. As an example, in the position shown in FIG. 7B, the slit openings 702 are halfway blocked (e.g., half a length of slit openings 702 are blocked) by shutter 602, decreasing the amount of flow between the interior volume 203 of pre-chamber 188 and the cylinder 130. The shutter 602 may move up and down depending on the engine load. For example, as the engine load increases, the shutter 602 may move down along the y-axis as shown on axis system 290. As the shutter 602 moves down, the shutter 602 covers slit openings 702 and decreases the flow between the pre-chamber 188 and the cylinder 130. As another example, the shutter 602 may not block the slit openings 702 when a lower surface of shutter 602 (e.g., the surface closest to the pre-chamber cap 234) is above fully above the slit openings 702. Thus flow between the cylinder 130 and the interior volume 203 of pre-chamber 188 is unobstructed and may act similarly to the second position 615 shown in FIG. 6B. In one example, motion of the shutter 602 may be limited such that it may not block an entirety of the slit openings 702. Movement of the shutter is illustrated via the arrow 704.

Moving now to FIG. 7C, an example pre-chamber sleeve 235 with openings 712 are shown. Openings 712 may include a T-shape, wherein a T-shape is defined as a first body intersecting a second body at a 90 degree angle. Herein, the openings 712 are referred to as T-shape openings 712. The T-shape openings 712 may be horizontal (e.g., parallel to the x-axis) slits with vertical (e.g., parallel to the y-axis) slits connected to the horizontal slits. The shutter 602 may be actuated to cover one or more openings of the T-shape openings 712. As illustrated, the T-shape openings 712 may be arranged along different diameters such that the shutter 602 may block a portion of a first set of T-shape openings before reaching a second set of T-shape openings. In one example, the shutter 602 may be configured to block only the first set of T-shape openings and not the second set of T-shape openings. As such, diameters along which the first and second sets of T-shape openings are arranged may not overlap.

Turning now to FIG. 7D, an example pre-chamber sleeve 235 is shown with triangle openings 710. Triangle openings 710 may be isosceles triangles with a point of the triangle openings 710 pointing down towards the pre-chamber cap 234, and a base the triangle openings 710 is parallel to the x-axis. For example, a length of the triangle openings 710 may be 4.5 to 5 or 5 to 5.5 times smaller than the diameter of shutter 602. As another example, a width of the base of triangle openings 710 may be 3 to 3.5 or 2.5 to 4 times smaller than the length of the triangle openings 710. The width of the triangle openings 710 decreases in size from the base of the triangle openings 710 to the point of triangle openings 710. FIG. 7D shows the shutter 602 fully unblocking the triangle openings 710, which may be a positon of shutter 602 used for low load engine conditions. Shutter 602 may partial block triangle openings 710 depending on the engine load. For example, the engine operating at a low to mid load range may have the actuator 225 position the shutter 602 anywhere between not blocking to blocking half the length of the triangle openings 710, with the shutter 602 increasingly blocking triangle openings 710 as engine load increases. A mid to high engine load may have the actuator 225 position the shutter 602 anywhere from half the length of triangle openings 710 to, for example, three-fourths, four-fifths, or five-fifths the length of the triangle openings 710. Similar to the previous examples shown in FIGS. 7B and 7C, the shutter 602 may not fully block the triangle openings 710 in order to not fully discontinue a flow of air, gases, fuel, etc. to occur between the pre-chamber 188 and the cylinder 130.

Continuing to FIG. 7E, an example pre-chamber sleeve 235 is shown with horizontal slits 708. When unblocked by rotatable tube 402, horizontal slits 708 fluidically couple the pre-chamber 188 and cylinder 130. Horizontal slits 708, for example, may have a width that is 3.5 to 4 or 4 to 4.5 times smaller than a diameter of the rotatable tube 402. As another example, the length of the horizontal slits may be 6 to 7 or 7 to 8 times smaller than the length of horizontal slits 708. The horizontal slits may be located on the pre-chamber sleeve 235 slightly above where the pre-chamber cap 234 and pre-chamber sleeve 235 connect. The plurality of openings 404 on the rotatable tube 402 may be rectangles that have a larger length but similar width to horizontal slits 708. When the plurality of openings 404 and horizontal slits 708 are aligned with each other, as shown in FIG. 7E, the horizontal slits 708 are fully unblocked and a flow between the cylinder 130 and the interior volume 203 of pre-chamber 188 is unhampered through horizontal slits 708. The position of rotatable tube 402 in FIG. 7E is similar to the positioning of rotatable tube 402 in FIG. 4B, and as such, may be actuated to this position by actuator 225 when engine loads are low. As engine loads increase, the rotatable tube 402 may rotate, indicated by arrow 410, and increasingly block horizontal slits 708 until the horizontal slits are only slightly unblocked. As an example, from low to mid-engine loads the rotatable tube may block none to half of the width of the horizontal slits 708. As another example, from mid to high engine loads the rotatable tube 402 may block half of the width to three-fourths, four-fifths, or five-fifths the width of the horizontal slits 708. The horizontal slits may not be fully unaligned with the plurality of openings 404 as that may not allow for the pre-chamber 188 to ignite an air-fuel mixture within the interior volume 203 and the cylinder 130. For example, a width from one horizontal slit to another horizontal slit may be smaller than the width of openings 404 to allow for part of the plurality of openings 404 to be partially aligned with horizontal slits 708. As another example, the rotatable tube 402 may rotate both clockwise and counter-clockwise such that the plurality of openings 404 may not be fully unaligned with horizontal slits 708 as engine loads change.

Moving now to FIG. 7F, an example of pre-chamber sleeve 235 is shown with a single set of circular openings 706. For example, circular openings 706 may be similar in size and position to the plurality of lower openings 242 shown in FIGS. 4A and 4B. However, unlike the examples shown in FIGS. 4A and 4B, there are no plurality of upper openings 238. Additionally, in some examples of the circular openings 706, some of circular openings 706 may have a larger diameter than other circular openings 706. As shown in FIG. 7E, rotatable tube 402 is a position such that each of the plurality of openings 404 on rotatable tube 402 are fully unblocking at least two of the circular openings 706, which may be referred to as a set of circular openings 706. The positon of rotatable tube 402 shown in FIG. 7E may be similar to the second position 415 shown in FIG. 4B in that this positon may be used for low load engine operations. In low to mid-engine load operations, rotatable tube 402 may partially to fully block one of the circular openings of the set of circular openings 706, for example. As another example, for mid to high engine loads, one of the circular openings of the set of circular openings 706 may be fully covered while the other circular openings is uncovered to partially covered by the rotatable tube 402.

In this way, the pre-chamber 188 may include a plurality of embodiments for adjusting an orifice size thereof. While the embodiments are illustrated as distinct embodiments, it will be appreciated that two or more of the embodiments may be combined without departing from the scope of the present disclosure. For example, the pre-chamber 188 may include shutters for adjusting an orifice size of a first group of openings while further comprising a poppet valve for adjusting an orifice size of another, different opening. As another example, shutters may be arranged in walls of a pre-chamber cap body for adjusting an orifice size of the first group of openings while shutters outside the pre-chamber cap may be configured to adjust an orifice size of a second group of openings different than the first group.

FIGS. 2A-7F show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 8, a method 800 is shown for operating a pre-chamber in an engine. As an example, the engine may be engine 10 inside of vehicle 5 shown in FIG. 1. As another example, the pre-chamber may be pre-chamber 188 shown in FIG. 1 and may be any pre-chamber system describe in FIGS. 2A-6B. A portion of the pre-chamber may be able to move to increase or decrease a size of a plurality of openings. Instructions for carrying out method 800 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the method described below. Execution of method 800 may be applied to one or more pre-chambers of the engine.

At 802, method 800 includes estimating and/or measuring operating conditions. The operating conditions may include, for example, an engine speed, an engine load, a cylinder AFR, an exhaust gas AFR, an engine temperature, an intake air temperature, an accelerator pedal position, a brake pedal position, a manifold vacuum, an EGR rate, a camshaft timing, and an exhaust gas temperature. The operating conditions may be measured by one or more sensors communicatively coupled to the controller or may be inferred based on available data. For example, the controller may estimate the engine load by inputting a throttle position and a mass air flow (MAF) sensor reading into one or more look-up tables, maps, or functions, which may output the engine load. As another example, engine load may be determined in response to the manifold vacuum, determined via a pressure sensor or estimated based on an engine speed and mass air flow. As another example, the engine temperature may be measured by an engine coolant temperature sensor, such as ECT sensor 112 of FIG. 1. As yet another example, the accelerator pedal position may be measured by an accelerator pedal position sensor, such as accelerator pedal position sensor 118 of FIG. 1, and the brake pedal position may be measured by a brake pedal position sensor, such as brake pedal position sensor 119 of FIG. 1. Together, the accelerator pedal position and the brake pedal position may indicate a demanded amount of engine torque.

At 804, method 800 includes determining if ignition is requested. In some examples, ignition may be requested if the engine is being fueled. Ignition may not be requested in response to an engine shut-down, a coasting event, and/or a start/stop. A combustion cycle (e.g., a cylinder cycle) may refer to a four stroke movement of a piston of the cylinder, the four strokes including an intake stroke, a compression stroke, a power stroke, and an exhaust stroke. When ignition is requested, a spark, provided via actuation of an ignition device, may occur near top-dead center (TDC) the compression stroke. Further, the ignition device may be a spark plug, which may ignite an air-fuel mixture within the pre-chamber that may send jets of hot gas and flame from the pre-chamber to the cylinder.

If the controller determines that ignition is not requested at 804, method 800 may proceed to 806, which includes maintaining a pre-chamber position. A moveable element of the pre-chamber may not be actuated to adjust an orifice opening size thereof. Additionally, the ignition device of the pre-chamber may not be actuated to provide a spark.

Method 800 may end. For example, method 800 may be repeated at a pre-determined frequency during engine operation to determine whether pre-chamber ignition to the cylinder is desired across a variety of operating conditions.

Returning to 804, if ignition is requested, method 800 may proceed to determining if the engine load is high at 808. The engine load may be a high load if feedback from the MAF sensor indicates a relatively high air flow. Additionally or alternatively, MAF sensor feedback may be compared to values stored in a look-up table on memory of the controller, wherein the values correspond to varying loads of the engine. In one example, the values are categorized by idle load, low load, mid load, and high load, wherein an output of the look-up directly provides a current load of the engine. The categorization may be based on various thresholds, wherein values less than a lower threshold load are categorized as low or idle loads, and values above an upper threshold load are categorized as high loads. Thus, values greater than or equal to the lower threshold load and less than or equal to the upper threshold load may be categorized as mid-loads. The lower threshold load and the upper threshold load may be non-zero, positive values. If the engine load is high at 808, method 800 includes operating the pre-chamber in a first position at 810. For example, the first position may be the position at which an orifice opening size of the pre-chamber is reduced. In one example, the orifice openings size is reduced to a minimum value and one or more openings of the pre-chamber are fully blocked, as shown in FIGS. 2A, 3A, 4A, and 6A, wherein a plurality of upper openings are sealed in the first position. Additionally or alternatively, a single opening may be blocked via a valve, as shown in FIG. 5A.

At 812, method 800 may include actuating a portion of the pre-chamber. Actuating the portion of the pre-chamber may include rotating, sliding, or other types of actuation. The controller may signal to an actuator (e.g., actuator 225 shown in FIGS. 2A-6B) to actuate one or more moveable portions of the pre-chamber. For example, the actuator may actuate the adjustable portions such that the orifice opening size of the pre-chamber is reduced. In one example, this may include fully blocking (e.g., sealing) one or more openings of the pre-chamber.

Operating the pre-chamber in a first position may further include actuating a spark plug at a desired timing at 814.

Determining the desired spark timing (and thus the actuation timing) may include determining when to ignite the air-fuel mixture in the pre-chamber relative to a position of a piston of the cylinder. For example, the desired timing may be when the piston position may be near top dead center (TDC) of a compression stroke during the four-stroke engine cycle. During the compression stroke, the piston is moving toward TDC causing an air-fuel mixture in the cylinder to compress and flow into the pre-chamber through openings (e.g., the plurality of lower openings 242 shown in FIGS. 2A-6B) fluidically coupling the pre-chamber and cylinder. With an air-fuel mixture within the pre-chamber, the actuated spark plug may create a spark at a spark gap on the spark plug that ignites the air-fuel mixture and sends jets of flames into the cylinder through lower openings (e.g., the plurality of lower openings 242 shown in FIGS. 2A-6B). The jets of flame may quickly combust the remaining air-fuel mixture within the cylinder, causing the piston to be pushed down to bottom dead center (BDC) of the cylinder and thus powering the vehicle.

Method 800 may end. For example, method 800 may be repeated at a pre-determined frequency during engine operation to move adjustable parts as parameters, such as engine load, in the engine may change.

Returning to 808 in method 800, if the engine load is not high, method 800 determines if the engine load is low at 816. The engine load may be determined as described above at 808.

If the engine load is a low load, method 800 continues to 818 which includes operating the pre-chamber in a second position. For example, operating the pre-chamber in a second position includes increasing an orifice opening size. In an example, a plurality of openings may be fully open as shown in FIGS. 2B, 3B, 4B, 5B, and 6B of the different pre-chamber embodiments. Additionally or alternatively, a single opening may be unblocked as shown in FIG. 5A.

At 820, method 800 may include actuating a portion of the pre-chamber, similar to 812 in method 800. For example, the controller may signal to the actuator to actuate one or more moveable portions of the pre-chamber such that the orifice opening size of the pre-chamber is increased. In one example, this may include fully unblocking one or more openings of the pre-chamber.

At 822, method 800 includes actuating the spark plug at a desired timing similarly to 814 of method 800. For example, the desired spark plug timing may be during the compression stroke near TDC. Operating in the second position may allow for the pre-chamber to act more like a conventional spark plug if the orifice openings are large enough to not cause jets of flames to shoot into the cylinder as the spark plug is actuated. In this way, the pre-chamber may be used in lower engine load conditions, avoiding misfires when the vehicle is idling.

Method 800 may then end. For example, method 800 may be repeated at a pre-determined frequency during engine operation to move adjustable parts as the engine load increases or decreases, allowing for the pre-chamber to function across various different engine loads.

Returning to 816 of method 800, if the engine load is not low the method proceeds to 824, which includes operating the pre-chamber in a variable position mode. The variable position mode may be selected when the engine is operating at mid-loads. The controller may determine a position of adjustable parts based on the engine load, such as by inputting the engine load into a look-up table, algorithm, or map stored in memory. The look-up table, algorithm, or map may output the corresponding position for the adjustable parts, which may be any position between the first position and the second position.

At 826, method 800 may optionally include adjusting movable parts of the pre-chamber. The adjustable parts may be moved by the actuator to the position determined by the controller at 824 in method 800. For example, the desired position for the engine load may be half way between the first position and the second position described above. As such, the adjustable parts may be moved by the actuator so that the additional openings are halfway open or halfway unblocked. In one example, if the load is closer to the upper load threshold, then the desired position may more closely resemble the first position than the second position, such that the plurality of upper openings are less open. As another example, if the load is closer to the lower load threshold, then the desired position may more closely resemble the second position than the first position, such that the plurality of upper openings are more open.

Additionally or alternatively, the orifice opening size may be adjusted in response to one or more of engine speed, engine temperature, an exhaust-gas recirculation (EGR) flow rate, valve timing, and the like. As one example, the orifice opening size may be reduced as the engine speed increases and/or as an engine temperature increases. As another example, the orifice opening size may be reduced as the EGR flow rate increases. Additionally or alternatively, advancing valve timing may include reducing the orifice opening size, adjusting an intake valve timing, adjusting an exhaust valve timing, and the like. In one example, the orifice opening size may be reduced as the intake valve timing is retarded.

In this way, the openings may be adjusted to more open or more closed positions. The more open position may more closely resemble the second position, wherein an orifice opening size is relatively large. As such, an engine load may be closer to the lower threshold load than the upper threshold load. As another example, the more closed position may more closely resemble the first position, wherein the orifice opening size may be relatively small. As such, an engine load may be closer to the upper threshold load than the lower threshold load.

At 828, method 800 includes actuating the spark plug at a desired timing, similar to 814 and 822 of method 800. For example, the spark plug maybe actuated near TDC of the compression stroke to ignite and air-fuel mixture within the pre-chamber. At lower loads but loads above the lower load threshold, this may cause the spark plug in the pre-chamber to act as a conventional spark plug if the additional openings are large enough and the adjustable parts are slightly block or close the additional openings. At higher loads, jets of flames may come out of both the additional openings and the lower openings, however, the velocity and intensity of the jets of flames may be lower than that of operating the pre-chamber in the first position.

Moving now to FIG. 9, an example graph 900 shows a relationship between an engine load and an orifice opening size of a pre-chamber (e.g., pre-chamber 188 of FIGS. 1-7F). Adjustable parts may refer to an adjustable pre-chamber cap (e.g., pre-chamber cap 234 shown in FIGS. 2A and 2B), shutters (e.g., the plurality of shutters 302 shown in FIGS. 3A and 3B), a movable tube (e.g., rotatable tube 402 shown in FIGS. 4A and 4B), a poppet valve (e.g., valve 502 shown in FIGS. 5A and 5B), or a tubular shutter (e.g., shutter 602 shown in FIGS. 6A and 6B). The adjustable parts may be moved to adjust an orifice opening size of the pre-chamber.

Graph 900 includes an orifice opening size plot 902, an upper load threshold 904, and a lower load threshold 906.

Engine load increases along the abscissa and orifice opening size increases along the ordinate. When the engine load is less than the lower load threshold 906, the adjustable parts are moved to the fully open position. As an example, the fully open position may be the second position described in reference to FIG. 8 and may be seen in FIGS. 2B, 3B, 4B, 5B, and 6B of the pre-chamber embodiments described above. The lower load threshold 906 may be a pre-determined value stored in memory that a controller may compare a measured engine load to and adjust engine operations accordingly. With the openings fully unobscured, flow between the pre-chamber and cylinder is increased, allowing the pre-chamber to provide a desired flame jetting despite less oxygen and fuel being delivered to the cylinder.

When the engine load is above the upper load threshold 904, the engine load is considered high and the adjustable parts are adjusted to a fully closed position. For example, the fully closed position may be the first position describe in reference to FIG. 8 and may be seen in FIGS. 2A, 3A, 4A, 5A, and 6A of the pre-chamber embodiments described above. The upper load threshold 904 may be a pre-determined value stored in memory that a controller may compare a measured engine load to and adjust engine operations accordingly. With the openings closed, flow between the pre-chamber and cylinder is decreased but not stopped as lower openings (e.g., the plurality of lower openings 242) remain unblocked. Thus, when an air-fuel mixture is ignited within the pre-chamber, jets of flames flowing out of the pre-chamber into the cylinder may be more forceful and increase combustion rates in the cylinder and increase engine efficiency at higher engine loads.

To operate the pre-chamber efficiently at mid loads (e.g., loads greater than the lower load threshold 906 and less than the upper load threshold 904), the position of the adjustable parts may vary proportionally with engine load. For example, as the load increases the adjustable parts may move such that the openings are more closed, or as engine load decreases the openings are more open. When the engine is operating at mid loads, the pre-chamber may be operating in the variable pre-chamber mode described within method 800 of FIG. 8. As a further example, the adjustable parts may be seen partially obscuring openings within FIGS. 7A-F.

At low mid-load engine operations, the openings may only be slightly blocked or closed by adjustable parts. Thus, the flow of air, gases, etc. from the cylinder to the pre-chamber is decreased from the flow that occurs at low engine load conditions where the openings are fully open. At mid load engine operations, the openings may be half open or halfway unblocked. In some embodiments, half of the openings may be blocked and/or closed while the other half are fully open and/or unblocked by the adjustable portions of the pre-chamber. For example, an actuator may block a portion of a group of openings arranged along a shared diameter while allowing a remaining portion to remain fully open. At higher mid-loads, adjusting the adjustable parts may close the openings further relative to the mid load and the lower, mid load. As another example, some adjustable parts of an embodiment may fully close and/or block the openings while other adjustable parts are maintained slightly open to allow air flow between the pre-chamber and the cylinder.

While FIG. 9 is illustrated with the orifice opening size being adjusted with respect to engine load, the orifice opening size may be adjusted, additionally or alternatively, with respect to engine speed, engine temperature, EGR flow rate, and valve timing. As the engine speed increases, engine temperature increases, EGR flow rate increases, and/or valve timing is advanced, the orifice opening size may be reduced.

In this way, an orifice opening size of a pre-chamber may be adjusted in response to engine loads. The orifice opening size may be inversely relative to engine load such that the orifice opening size decreases as the engine load increases or vice-versa. The technical effect of adjusting the orifice opening size of the pre-chamber is to enhance combustion conditions over a wider range of engine operating conditions than a pre-chamber with non-variable orifice opening size.

An embodiment of a system, comprises a pre-chamber arranged in a cylinder, wherein the pre-chamber includes a moveable element configured to adjust an orifice opening area of the pre-chamber. A first example of the system further includes where the moveable element is rotatable. A second example of the system, optionally including the first example, further includes where the moveable element is slidably actuated. A third example of the system, optionally including one or more of the previous examples, further includes where the moveable element is a valve. A fourth example of the system, optionally including one or more of the previous examples, further includes where wherein the orifice opening area is equal to a sum of an opening area of a plurality of first openings and a plurality of second openings. A fifth example of the system, optionally including one or more of the previous examples, further includes where the plurality of second openings are arranged closer to a cylinder head than the plurality of first openings. A sixth example of the system, optionally including one or more of the previous examples, further includes where only the opening area of the plurality of second openings is adjustable.

An embodiment of an engine system comprises a cylinder, a pre-chamber arranged in the cylinder, an ignition device arranged in the pre-chamber, wherein the ignition device is the only ignition device of the engine system, and a moveable element configured to adjust an orifice opening area of one or more openings arranged in walls of the pre-chamber. A first example of the engine system further includes where the ignition device comprises only one spark gap. A second example of the engine system, optionally including the first example, further includes where the ignition device is contained within walls of the pre-chamber and configured to provide a spark within an interior volume of the pre-chamber. A third example of the engine system, optionally including one or more of the previous examples, further includes where the one or more openings include a plurality of first openings, wherein the plurality of first openings comprise a fixed orifice opening area. A fourth example of the engine system, optionally including one or more of the previous examples, further includes at least one second opening, wherein the orifice opening area of the at least one second opening is adjustable via the moveable element. A fifth example of the engine system, optionally including one or more of the previous examples, further includes where the moveable element is a valve arranged within the pre-chamber, and wherein the valve is configured to adjust the orifice opening area of the at least one second opening. A sixth example of the engine system, optionally including one or more of the previous examples, further includes where the moveable element comprises a plurality of shutters, further comprising where the at least one second opening is one of a plurality of second openings, and wherein each of the plurality of shutters is configured to adjust the orifice opening area of one of the plurality of second openings. A seventh example of the engine system, optionally including one or more of the previous examples, further includes where a size of an interior volume of the pre-chamber is fixed as the moveable element is actuated.

An embodiment of a system, comprises a pre-chamber arranged in a cylinder, the pre-chamber comprising a plurality of lower openings and a plurality of upper openings, wherein the plurality of lower openings is arranged closer to a piston of the cylinder than the plurality of upper openings, an ignition device position to provide a spark directly to an interior volume of only the pre-chamber, and a pre-chamber cap separating the interior volume of the pre-chamber from the cylinder, wherein the pre-chamber cap is moveable. A first example of the system further includes a controller with computer readable instructions stored on non-transitory memory thereof that when executed enable the controller to adjust a position of the pre-chamber cap to adjust an orifice opening area of the plurality of upper openings in response to an engine load. A second example of the system, optionally including the first example, further includes where the instructions further enable the controller to adjust the position of the pre-chamber cap to a first position in response to the engine load being a low load, wherein the first position comprises where the interior volume of the pre-chamber is reduced and where the plurality of upper openings is sealed via a pre-chamber body. A third example of the system, optionally including one or more of the previous examples, further includes where the instructions further enable the controller to adjust the position of the pre-chamber cap to a second position in response to the engine load being a high load, wherein the second position comprises where the interior volume of the pre-chamber is increased and where the plurality of upper openings is fully exposed and outside a boundary of the pre-chamber body. A fourth example of the system, optionally including one or more of the previous examples, further includes where the pre-chamber includes no other inlets or additional outlets other than the plurality of lower openings and the plurality of upper openings.

An embodiment of a system comprises a pre-chamber including a plurality of first openings and a plurality of second openings and a plurality of shutters configured to adjust an opening area of only the plurality of second openings. A first example of the system further includes where the pre-chamber is arranged in a combustion chamber, further comprising an ignition device positioned to provide a spark in only an interior volume of the pre-chamber. A second example of the system, optionally including the first example, further includes where the ignition device comprises only one spark gap, further comprising where there are no other ignition sources in the combustion chamber and the pre-chamber other than the ignition device. A third example of the system, optionally includes one or more of the previous examples, further includes where the plurality of shutters is actuated in tandem. A fourth example of the system, optionally includes one or more of the previous examples, further includes where each of the plurality of shutters is actuated individually. A fifth example of the system, optionally includes one or more of the previous examples, further includes where the plurality of shutters is slidingly actuated parallel to a central axis of the pre-chamber. A sixth example of the system, optionally includes one or more of the previous examples, further includes where an interior volume of the pre-chamber is fixed during actuation of the plurality of shutters. A seventh example of the system, optionally includes one or more of the previous examples, further includes where the plurality of shutters is arranged within walls of the pre-chamber. An eighth example of the system, optionally includes one or more of the previous examples, further includes where the plurality of shutters is arranged in face-sharing contact with an interior surface of the pre-chamber.

An embodiment of an engine system comprises a pre-chamber comprising an interior volume separated from a combustion chamber via walls of a pre-chamber cap and a pre-chamber sleeve, a plurality of first openings and a plurality of second openings arranged in the pre-chamber sleeve, and a rotatable element configured to adjust an opening area of only the plurality of second openings, wherein an opening area of the plurality of first openings is fixed. A first example of the engine system, further including where the rotatable element comprises a plurality of openings, and wherein the opening area of the plurality of second openings is based on an alignment between the plurality of second openings and the plurality of openings. A second example of the engine system, optionally including a first example, further includes where a shape of the plurality of openings is different than a shape of the plurality of second openings. A third example of the engine system, optionally including one or more of the previous examples, further includes where a shape of the plurality of openings is identical to a shape of the plurality of second openings. A fourth example of the engine system, optionally including one or more of the previous examples, further includes where the rotatable element includes the pre-chamber cap and the pre-chamber sleeve, wherein an actuator is coupled to the rotatable element via a linkage. A fifth example of the engine system, optionally including one or more of the previous examples, further includes where a size of the interior volume does not change as the rotatable element is actuated via an actuator.

An embodiment of a method for an engine system comprising a pre-chamber arranged in a cylinder, the pre-chamber including a plurality of openings and a moveable element, the engine system further comprising a controller with computer-readable instructions stored on non-transitory memory thereof that when executed enable the controller to execute the method, the method comprises adjusting an opening size of the plurality of openings in response to an engine load, engine speed, engine temperature, exhaust-gas recirculation flow rate, and a valve timing. A first example of the method, further includes where the adjusting includes decreasing the opening size of the plurality of openings to a fully closed size in response to the engine load being higher than an upper threshold load, wherein decreasing the opening size further includes actuating the moveable element to a first position configured to at least partially seal the plurality of openings. A second example of the method, optionally including the first example, further includes where the adjusting includes increasing the opening size of the plurality of openings to a fully open size in response to the engine load being less than a lower threshold load, wherein increasing the opening size further includes actuating the moveable element to a second position configured to fully open the plurality of openings. A third example of the method, optionally including one or more of the previous examples, further includes where the adjusting further includes actuating the moveable element to a position between the first position and the second position in response to the engine load being greater than or equal to the lower threshold load and less than or equal to the upper threshold load. A fourth example of the method, optionally including one or more of the previous examples, further includes where the plurality of openings comprises a circular shape, a square shape, a triangular shape, or a T-shape.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a pre-chamber arranged in a cylinder, wherein the pre-chamber includes at least one moveable element configured to adjust an orifice opening area of the pre-chamber and the orifice opening area is equal to a sum of an opening area of a plurality of first openings and a plurality of second openings.

2. The system of claim 1, wherein the at least one moveable element is rotatable.

3. The system of claim 1, wherein the at least one moveable element is slidably actuated.

4. The system of claim 1, wherein the at least one moveable element is a valve.

5. The system of claim 1, wherein the plurality of second openings are arranged closer to a mounting surface than the plurality of first openings.

6. The system of claim 1, wherein only the opening area of the plurality of second openings is adjustable.

7. An engine system, comprising;
a cylinder;
a pre-chamber arranged in the cylinder;
an ignition device arranged in the pre-chamber, wherein the ignition device is the only ignition device of the engine system; and
a moveable element configured to adjust an orifice opening area of one or more openings arranged in walls of the pre-chamber, wherein the one or more openings include a plurality of first openings and the plurality of first openings comprise a fixed orifice opening area.

8. The engine system of claim 7, wherein the ignition device comprises only one spark gap.

9. The engine system of claim 7, wherein the ignition device is contained within walls of the pre-chamber and configured to provide a spark within an interior volume of the pre-chamber.

10. The engine system of claim 7, further comprising at least one second opening, wherein the orifice opening area of the at least one second opening is adjustable via the moveable element.

11. The engine system of claim 10, wherein the moveable element is a valve arranged within the pre-chamber, and wherein the valve is configured to adjust the orifice opening area of the at least one second opening.

12. The engine system of claim 10, wherein the moveable element comprises a plurality of shutters, further comprising where the at least one second opening is one of a plurality of second openings, and wherein each of the plurality of shutters is configured to adjust the orifice opening area of one of the plurality of second openings.

13. The engine system of claim 7, wherein a size of an interior volume of the pre-chamber is fixed as the moveable element is actuated.

14. A system, comprising:
a pre-chamber arranged in a cylinder, the pre-chamber comprising a plurality of lower openings and a plurality of upper openings, wherein the plurality of lower openings is arranged closer to a piston of the cylinder than the plurality of upper openings;
an ignition device position to provide a spark directly to an interior volume of only the pre-chamber; and
a pre-chamber cap separating the interior volume of the pre-chamber from the cylinder, wherein the pre-chamber cap is moveable.

15. The system of claim 14, further comprising a controller with computer readable instructions stored on non-transitory memory thereof that when executed enable the controller to:
adjust a position of the pre-chamber cap to adjust an orifice opening area of the plurality of upper openings in response to one or more of an engine load, engine speed, engine temperature, exhaust-gas recirculation flow rate, and a valve timing.

16. The system of claim 15, wherein the computer readable instructions further enable the controller to adjust the position of the pre-chamber cap to a first position in response to the engine load being a low load, wherein the first position comprises where the interior volume of the pre-chamber is reduced and where the plurality of upper openings is sealed via a pre-chamber body.

17. The system of claim 16, wherein the computer readable instructions further enable the controller to adjust the position of the pre-chamber cap to a second position in response to the engine load being a high load, wherein the second position comprises where the interior volume of the pre-chamber is increased and where the plurality of upper openings is fully exposed and outside a boundary of the pre-chamber body.

18. The system of claim 14, wherein the pre-chamber includes no other inlets or additional outlets other than the plurality of lower openings and the plurality of upper openings.

* * * * *